United States Patent
Rikitake et al.

(10) Patent No.: US 7,539,775 B2
(45) Date of Patent: May 26, 2009

(54) COMMUNICATIONS SYSTEM, AND COMMUNICATION DEVICE AND NETWORK MANAGEMENT DEVICE, WHICH ARE USED THEREIN

(75) Inventors: Nobuhiro Rikitake, Kawasaki (JP); Satoshi Miyazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 808 days.

(21) Appl. No.: 10/721,548

(22) Filed: Nov. 26, 2003

(65) Prior Publication Data
US 2004/0153529 A1 Aug. 5, 2004

(30) Foreign Application Priority Data
Dec. 10, 2002 (JP) .............................. 2002-357396

(51) Int. Cl.
G06F 15/16 (2006.01)
(52) U.S. Cl. .................. 709/246; 709/223; 709/230
(58) Field of Classification Search ................ 709/246, 709/223, 230
See application file for complete search history.

(56) References Cited

U.S. PATENT DOCUMENTS

| 2002/0012318 | A1 | 1/2002 | Moriya et al. |
| 2004/0008988 | A1* | 1/2004 | Gerstal et al. ................. 398/45 |
| 2004/0076151 | A1* | 4/2004 | Fant et al. .................... 370/389 |
| 2004/0156325 | A1* | 8/2004 | Perkins et al. .............. 370/299 |
| 2006/0098686 | A1* | 5/2006 | Takakuwa et al. ........... 370/470 |
| 2006/0274785 | A1* | 12/2006 | Kunimatsu et al. .......... 370/466 |

FOREIGN PATENT DOCUMENTS

| JP | 2001-69104 | 3/2001 |
| JP | 2001-177491 | 6/2001 |
| JP | 2001-352342 | 12/2001 |

OTHER PUBLICATIONS

Nobuhide Yamaguchi, "Photonic Network", Fujitsu, vol. 51, No. 6, Nov. 10, 2000.
Office Action for corresponding Japanese Patent Application No. 2002-357396 dated Jun. 29, 2006.
ITU-T G. 709/Y.1331 "Interfaces for the Optical Transport Network", International Telecommunication Union, Feb. 2001.

* cited by examiner

*Primary Examiner*—John Follansbee
*Assistant Examiner*—Nghi V Tran
(74) *Attorney, Agent, or Firm*—Staas & Halsey LLP

(57) ABSTRACT

Communication nodes respectively comprise a function for transmitting/receiving a digital wrapper frame. SDH devices transmitting/receiving an SDH frame are connected to some of the communication nodes, and Ethernet devices transmitting/receiving an Ethernet packet are connected to some others of the communication nodes. An SDH frame and an Ethernet packet are stored in a payload of a digital wrapper frame, and transmitted between communication nodes. A network management device manages a connection relationship among the communication nodes, and paths set up on a digital wrapper network. The communication nodes respectively transfer a digital wrapper frame in accordance with an instruction from the network management device.

9 Claims, 27 Drawing Sheets

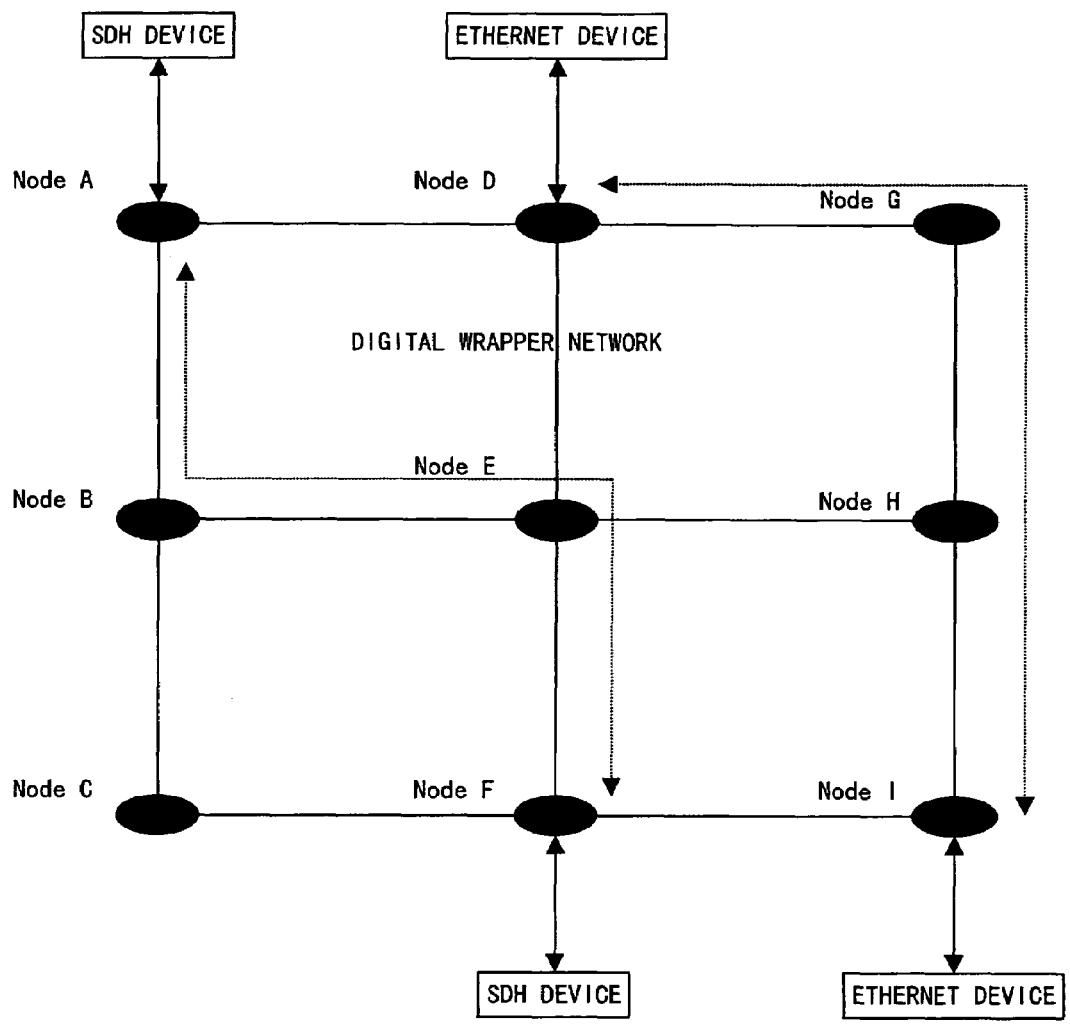
F I G. 1

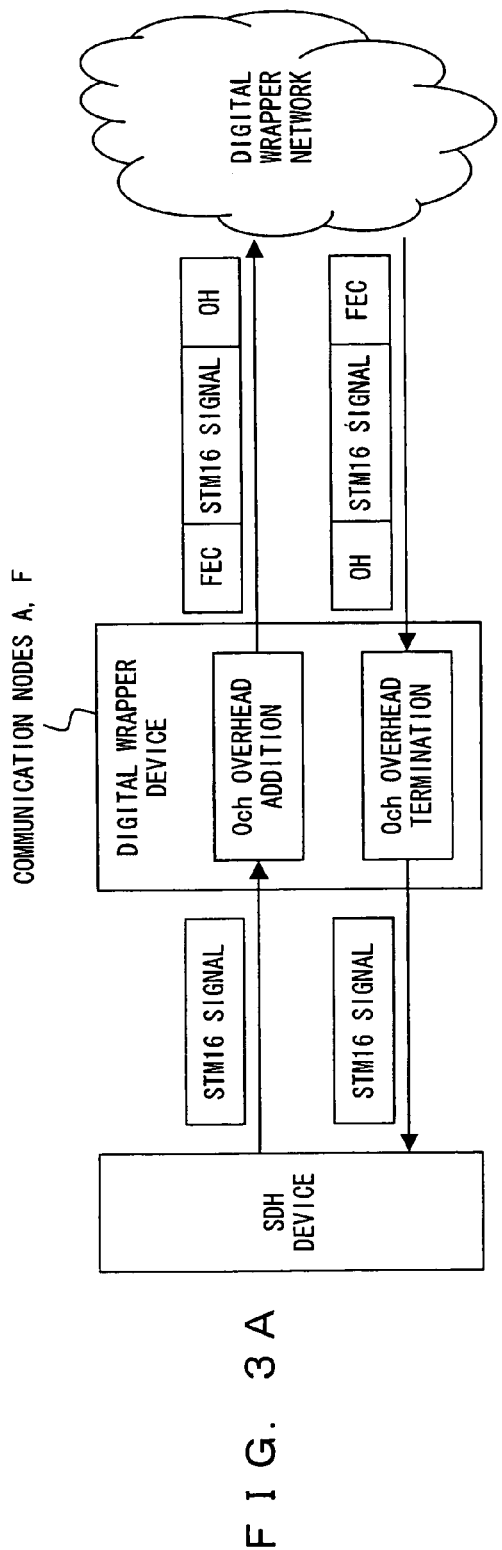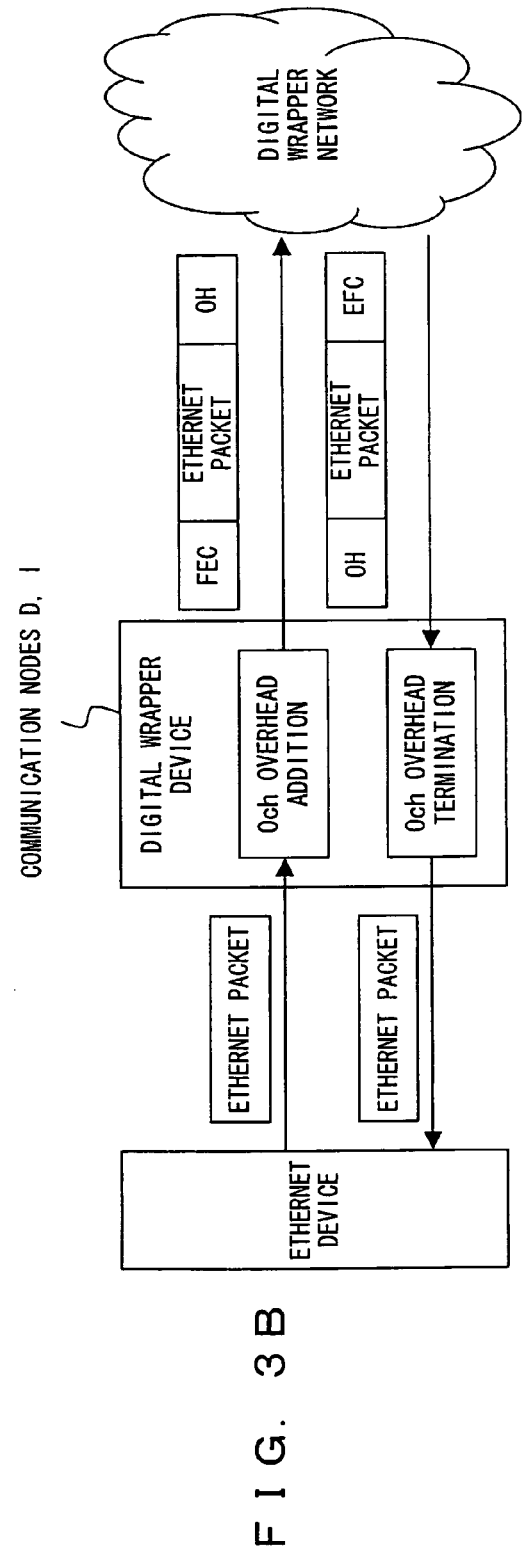
FIG. 3A
FIG. 3B

| | A | B | C | D | E | F | G | H | I |
|---|---|---|---|---|---|---|---|---|---|
| A | | x | | x | | | | | |
| B | x | | x | | x | | | | |
| C | | x | | | x | | | | |
| D | x | | | | x | | x | | |
| E | | x | | x | | x | | x | |
| F | | | x | | x | | | x | |
| G | | | | x | | | | x | |
| H | | | | | x | | x | | x |
| I | | | | | | x | | x | | x : LINE EXISTS

FIG. 10

|   | A | B | C | D | E | F | G | H | I |
|---|---|---|---|---|---|---|---|---|---|
| A |   | × |   |   |   |   |   |   |   |
| B | × |   |   |   | × |   |   |   |   |
| C |   |   |   |   |   |   |   |   |   |
| D |   |   |   |   |   |   | × |   |   |
| E |   | × |   |   | × |   |   |   |   |
| F |   |   |   | × |   |   |   |   |   |
| G |   |   |   | × |   |   | × |   |   |
| H |   |   |   |   |   |   | × |   | × |
| I |   |   |   |   |   |   |   | × |   |

× : IN USE

F I G. 1 1

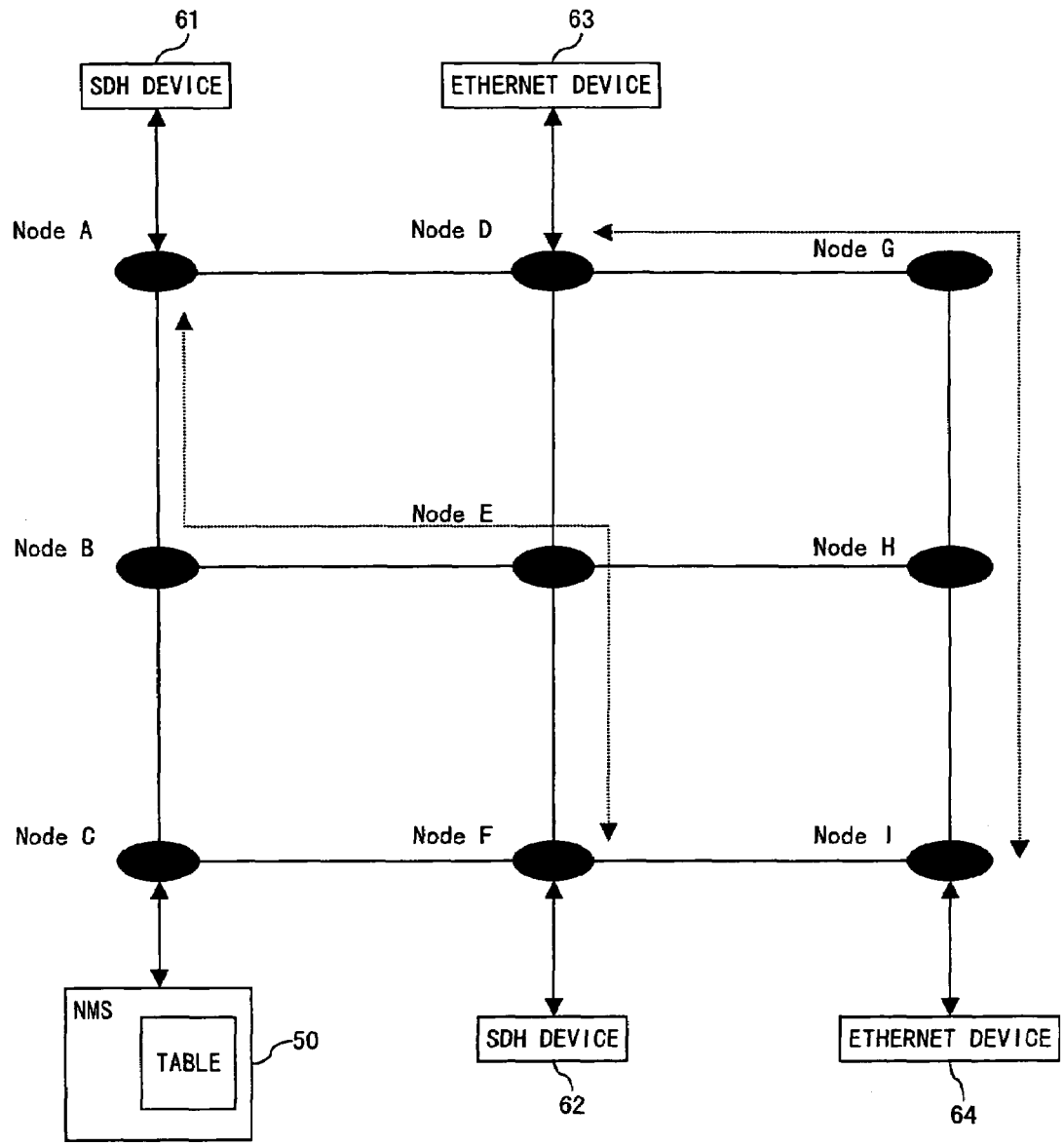
F I G. 1 2

|   | A | B | C | D | E | F | G | H | I |
|---|---|---|---|---|---|---|---|---|---|
| A |   | × |   |   |   |   |   |   |   |
| B | × |   |   |   | × |   |   |   |   |
| C |   |   |   |   |   |   |   |   |   |
| D |   |   |   |   |   |   | × |   |   |
| E |   | × |   |   |   | × |   |   |   |
| F |   |   |   |   | × |   |   |   |   |
| G |   |   |   | × |   |   |   | × |   |
| H |   |   |   |   |   |   | × |   | × |
| I |   |   |   |   |   |   |   | × |   |

↓ UPDATE

|   | A | B | C | D | E | F | G | H | I |
|---|---|---|---|---|---|---|---|---|---|
| A |   | × |   |   |   |   |   |   |   |
| B | × |   |   |   | × |   |   |   |   |
| C |   |   |   |   |   |   |   |   |   |
| D |   |   |   |   | × |   |   |   |   |
| E |   | × |   | × |   | × |   | × |   |
| F |   |   |   |   | × |   |   |   |   |
| G |   |   |   |   |   |   |   | FAULT |   |
| H |   |   |   |   | × |   | FAULT |   | × |
| I |   |   |   |   |   |   |   | × |   |

× : IN USE

F I G. 1 4

| OH | DIGITAL WRAPPER PAYLOAD (WORKING SYSTEM) SDH FRAME (STM16/STM64) | DIGITAL WRAPPER PAYLOAD (STANDBY SYSTEM) | FEC |
|---|---|---|---|
| | | | |

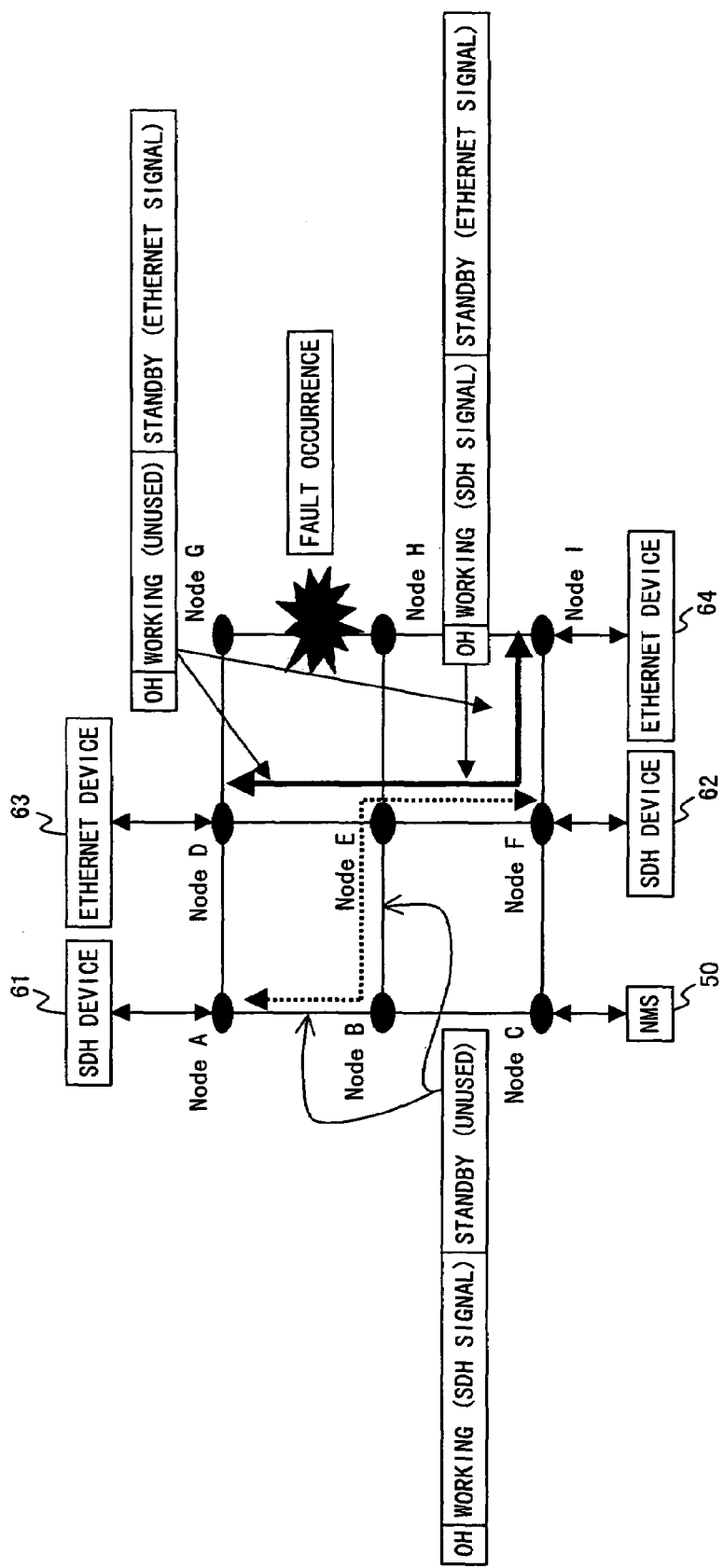
F I G. 1 8

|   | A | B | C | D | E | F | G | H | I |
|---|---|---|---|---|---|---|---|---|---|
| A |   | SDH |   | SDH |   |   |   |   |   |
| B | SDH |   |   |   | SDH |   |   |   |   |
| C | SDH |   |   |   |   | ETHERNET |   |   |   |
| D |   | SDH | ETHERNET |   |   |   | SDH | SDH |   |
| E |   |   |   | SDH |   |   |   |   |   |
| F |   |   | ETHERNET | SDH |   |   |   |   |   |
| G |   |   |   |   | SDH |   |   | SDH |   |
| H |   |   |   |   |   | ETHERNET | SDH |   | ETHERNET |
| I |   |   |   |   |   |   |   |   |   |

FIG. 23

COMMUNICATIONS SYSTEM, AND COMMUNICATION DEVICE AND NETWORK MANAGEMENT DEVICE, WHICH ARE USED THEREIN

BACKGROUND OF THE INVENTION

1. Field of the Invention

The present invention relates to an optical communications system using digital wrapper technology, and to a communication device and a network management device, which are used in the communications system.

2. Description of the Related Art

With an increase in data traffic transmitted/received via a network, network configuration methods (such as SDH/SONET, Ethernet (trademark), etc.) have been diversified in recent years. Additionally, as the scale of a network, a large-scale network where transmission lines as long as several thousands of kilometers are installed, and several tens of communication devices are provided is commercialized. Furthermore, transmission rates differ depending on communication services rendered in many cases. Besides, there is a demand for building a large-scale network where these networks are integrated.

SDH (Synchronous Digital Hierarchy) is a frame format that is standardized internationally. STM-16 of 2.4 Gbits/s, STM-64 of 10 Gbits/s, etc. are recommended based on STM-1 of 156 Mbits/s. Additionally, in the United States, SONET (Synchronous Optical NETwork), which is substantially the same technology as SDH, is a de facto standard. In the meantime, Ethernet is a packet communication method using CSMA/CD (Carrier Sense Multiple Access with Collision Detection) technology, and is widespread throughout the world.

However, in an SDH/SONET communications network, a unique overhead (header information) is added to the beginning of each frame, and a communication between communication nodes is established based on the overhead. Accordingly, a device that cannot process this overhead is unavailable within an SDH/SONET communications network. On the other hand, in an Ethernet network, data is transmitted/received with a packet having a predetermined format. Therefore, a device that cannot process this packet is unavailable within an Ethernet network.

As described above, if networks of different communication methods exist, their configurations become redundant.

As a technology for solving this problem, attention is focused on digital wrapper technology, which is stipulated in ITU-T (International Telecommunication Union Telecommunication standardization sector) G709. The "digital wrapper" is a frame formatting technology for an OTN (Optical Transport Network), and sometimes called "Digital Pipe". In a digital wrapper network, a signal of any method (an SDH/SONET signal, an Ethernet signal, etc.) is stored in a predetermined format and transmitted. Namely, a signal of any communication method is wrapped with a predetermined format, and transmitted. Details of the description on the digital wrapper technology are disclosed as a publication of ITU-T (for example, see Non-patent Document 1). Besides, as to the technology for storing an SDH frame, etc. in a frame having a different form and for transmitting the frame, a patent application has been already filed (for example, see Patent Document 1).

[Non-patent Document 1]

ITU-T G.709/Y.1331

[Patent Document 1]

Japanese Patent Publication No. 2001-177491 (FIG. 3, paragraphs 0050 to 0055 and 0066).

However, the digital wrapper is a new technology, and its details are currently under study. Accordingly, how to build a network with the digital wrapper technology, or the details of a data structure of an overhead of a digital wrapper frame has not been finalized yet.

Consequently, almost no studies have been made to restore a fault when it occurs on a network built with the digital wrapper technology. Or, almost no studies have been made to enhance the reliability (fault tolerance) of a network built with the digital wrapper technology. Note that the Patent Document 1 provides a function for switching a session by using a newly defined overhead when a fault occurs. With this function, however, only a session is switched by devices existing at both ends of a transmission line on which the fault occurs, and efficient restoration considering an entire network cannot be made.

SUMMARY OF THE INVENTION

An object of the present invention is to provide a method building a network with digital wrapper technology. Another object of the present invention is to allow efficient restoration to be made when a fault occurs on a network built with digital wrapper technology.

A communications system according to the present invention, which is used in a network where a plurality of communication nodes are connected, comprises: a digital wrapper unit, which is provided in each of the plurality of communication nodes, transmitting/receiving a digital wrapper frame; a converting unit, which is provided in each of first and second communication nodes among the plurality of communication nodes, performing mutual conversion between data in a predetermined format and a digital wrapper frame; and a network management unit managing states of the plurality of communication nodes. The digital wrapper unit transmits the digital wrapper frame, which is obtained by the converting unit provided in the first communication node, to the second communication node in accordance with an instruction from the network management unit, and the converting unit provided in the second communication node converts the received digital wrapper frame into the data in the predetermined format.

In this communications system, data in an arbitrary format is converted into a digital wrapper frame, and transmitted from the first communication node to the second communication node. Accordingly, a signal of any communication method can be transmitted via one or more of the communication nodes.

In this communications system, the network management unit may be configured to comprise a first storing unit storing topology information that represents a connection relationship among the plurality of communication nodes, a second storing unit storing route information that represents a communication route connecting the first and the second communication nodes, and a controlling unit giving an instruction to a communication node involved in the communication route based on the topology information and the route information. With this configuration, communication routes to be set up on the network are managed in a centralized manner, so that efficient route settings can be made.

A communication device according to the present invention is an arbitrary communication device among a plurality of communication devices, which is used in a network where the plurality of communication devices are connected. The communication device comprises: first, second and third optical splitters that respectively split optical signals received via first, second and third optical input lines; a first optical switch selecting one of the optical signals output from the second optical splitter and the third optical splitter, and guiding the selected optical signal to a first optical output line; a second optical switch selecting one of the optical signals output from the first optical splitter and the third optical splitter, and guiding the selected optical signal to a second optical output line; a third optical switch selecting one of the optical signals output from the first optical splitter and the second optical splitter, and guiding the selected optical signal to a third optical output line; a processing unit processing an overhead of a digital wrapper frame that is transmitted via the first optical input line and the first optical output line; and a controlling unit controlling the first to the third optical switches in accordance with an instruction for setting up a communication route via the plurality of communication devices.

With this configuration, data input from an arbitrary optical input line can be guided to an arbitrary optical output line. Additionally, data input from the first or the second optical input line can be stored in a digital wrapper frame and guided to the third optical output line, and data can be extracted from a digital wrapper frame input from the third optical input line and guided to the first or the second optical output line. Besides, an optical splitter and an optical switch are added/deleted, whereby network expansion or a change in a network configuration can be made with ease.

A network management device according to the present invention, which is a device managing a network where a plurality of communication nodes are connected, comprises: a first storing unit storing topology information that represents a connection relationship among the plurality of communication nodes; a second storing unit storing route information that represents a communication route connecting first and second communication nodes, each of which comprises a converting unit performing mutual conversion between data in a predetermined format and a digital wrapper frame, among the plurality of communication nodes; and a controlling unit giving an instruction for transmitting a digital wrapper frame to a communication node involved in the communication route based on the topology information and the route information.

With this configuration, communication nodes that transmit a digital wrapper frame can be managed in a centralized manner.

BRIEF DESCRIPTION OF THE DRAWINGS

FIG. 1 shows one example of a communications system according to the present invention;

FIGS. 3A and 3B explain the creation and the termination of a digital wrapper frame;

FIG. 10 shows an implementation example of a mesh table;

FIG. 11 shows an implementation example of a route table;

FIG. 12 shows paths set up on a digital wrapper network;

FIG. 14 shows an example of an update of a route table;

FIG. 15 shows the format of a digital wrapper frame according to a further preferred embodiment;

FIGS. 16A and 16B show implementation examples of a route table according to the further preferred embodiment;

FIG. 18 shows a method restoring a fault in the further preferred embodiment;

FIG. 23 shows an implementation example of a route table in the preferred embodiment shown in FIG. 22;

DESCRIPTION OF THE PREFERRED EMBODIMENTS

Hereinafter, preferred embodiments according to the present invention are described with reference to the drawings.

Figure 1:
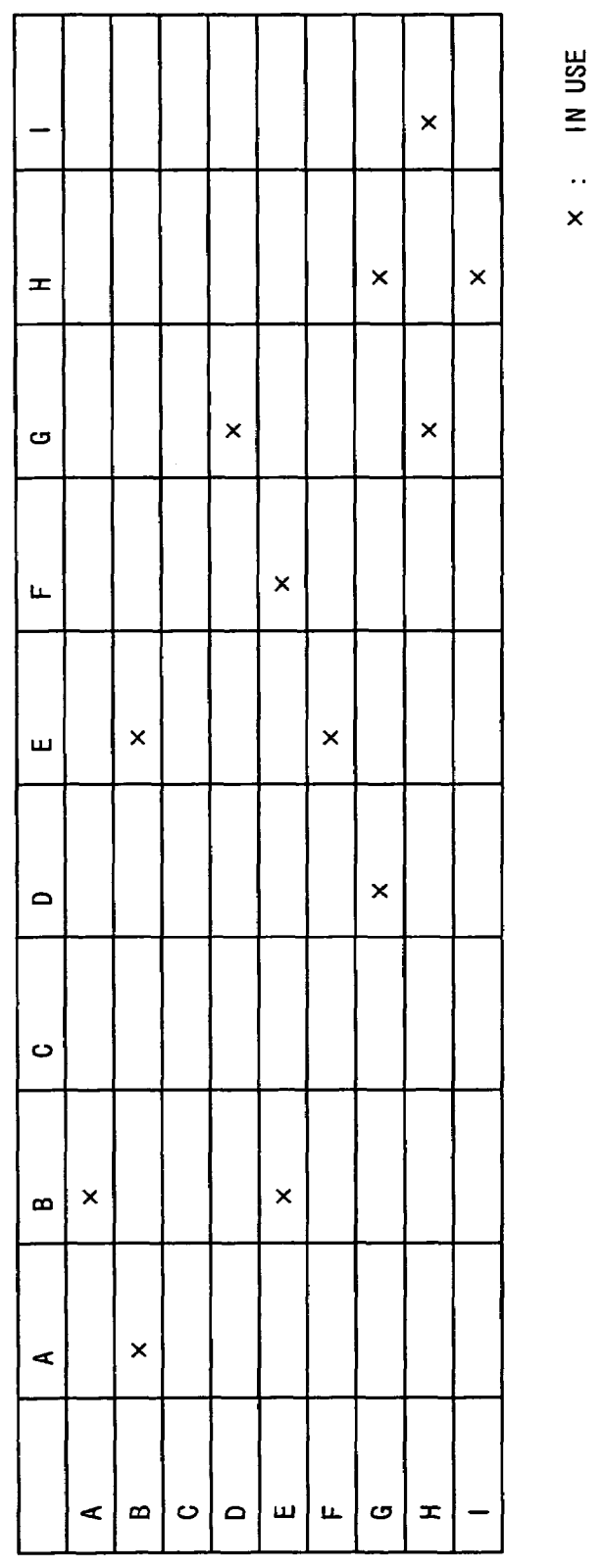

FIG. 1 shows one example of a communications system according to the present invention, and illustrates the configuration of a network using digital wrapper technology.

The example shown in FIG. 1 depicts a network where 9 communication nodes (nodes A to I) are connected in a mesh state. Here, the communication nodes A to I respectively comprise a function for transmitting and receiving a digital wrapper frame stipulated in ITU-T G709. The "connection in a mesh state" is not uniquely defined, but means, for example, a network configuration where each of the communication nodes is connected to one or a plurality of other communication nodes, and a plurality of paths reaching from one arbitrary communication node to another can possibly exist. The communication nodes A to I configure a digital wrapper network.

Each of the communication nodes can accommodate lines of a predetermined communication method. Here, SDH lines are connected to each of the communication nodes A and F, and Ethernet lines are connected to each of the communication nodes D and I. In FIG. 1, the SDH lines and the Ethernet lines are connected to the digital wrapper network configured by the communication nodes A through I. However, lines of another communication method (such as SONET lines, ATM lines, etc.) may be connected to the digital wrapper network.

Figure 2:
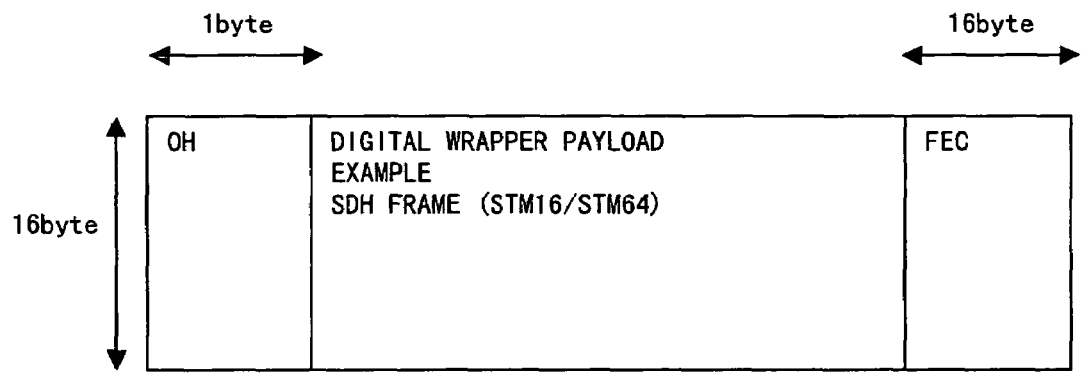
FIG. 2 shows the format of a digital wrapper frame.

FIG. 2 shows the format of a digital wrapper frame. The digital wrapper frame is transmitted and received between communication nodes in FIG. 1. The format of a digital wrapper frame is currently under study in ITU-T, and its details have not been finalized yet. However, the frame is configured by an overhead (OH), a payload, and a forward error correction (FEC) code. Here, the overhead stores control information for transmitting data stored in the payload, and the like. The payload stores an SDH/SONET frame or an Ethernet packet as it is. At this time, a pointer pointing to an address where these pieces of data are stored is written to the overhead. Namely, a digital wrapper frame can wrap data of other communication methods (such as a frame, a packet, etc.) unchanged. Accordingly, data of any communication method can be transmitted via the digital wrapper network. Note that the error correction code can be implemented by existing technologies, and provided to correct a transmission error in a reception device.

A communication node, which accommodates lines of a predetermined communication method, comprises a function for performing mutual conversion between data of the predetermined communication method (such as an SDH/SONET frame, an Ethernet packet, etc.) and a digital wrapper frame. For example, the communication nodes A and F respectively comprise a function for storing an SDH frame (an STM16 signal here) in a payload of a digital wrapper frame and for adding an overhead and an error correction code to the payload, and a function for terminating an overhead of a digital wrapper frame and for extracting an SDH frame from a payload, as shown in FIG. 3A. In the meantime, the communication nodes D and I respectively comprise a function for storing an Ethernet packet in a payload of a digital wrapper frame and for adding an overhead and an error correction code to the payload, and a function for terminating an overhead of a digital wrapper frame and for extracting an Ethernet packet from a payload, as shown in FIG. 3B.

Figure 4:
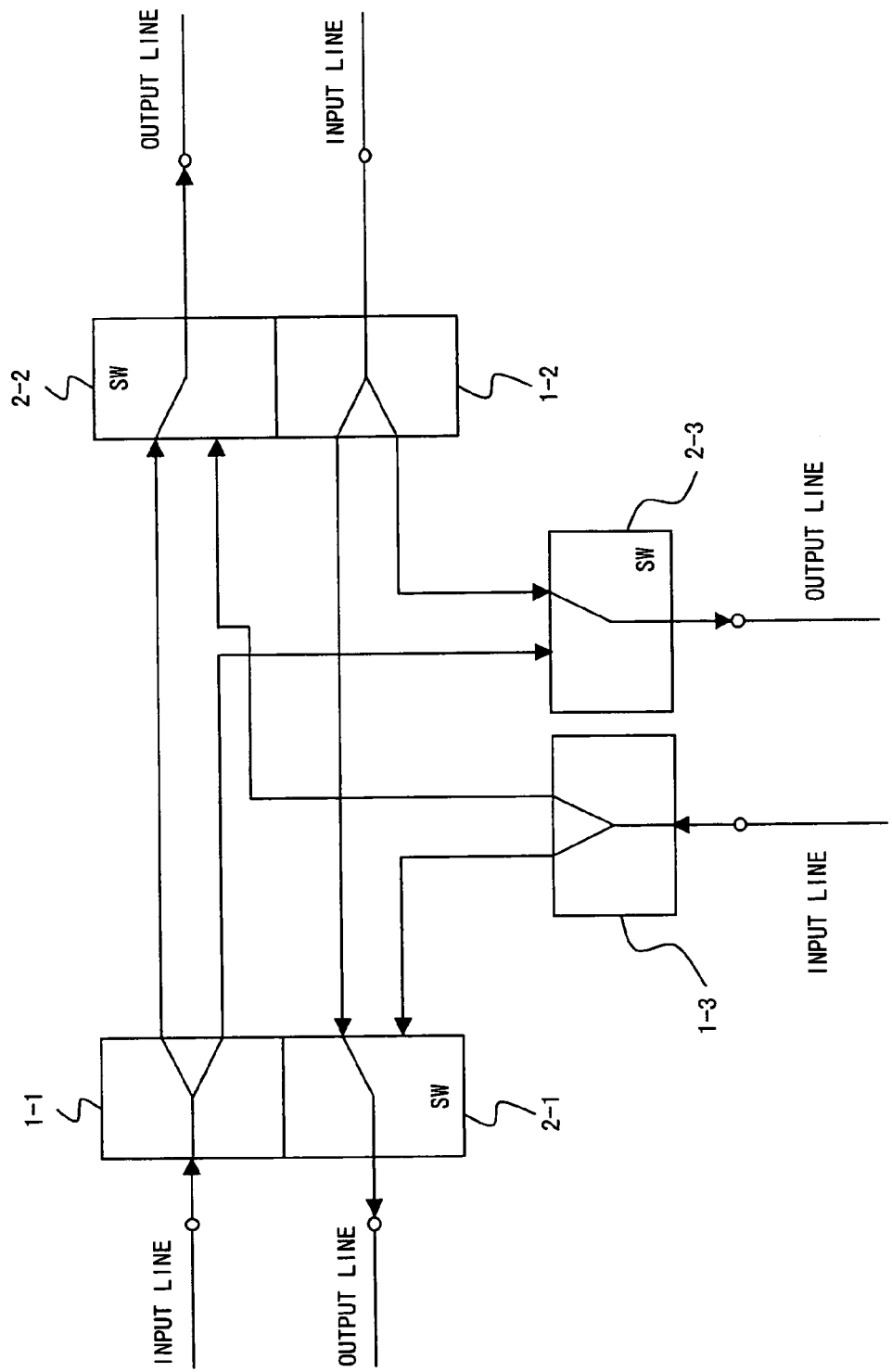
FIG. 4 is a schematic diagram showing a path switching function of each communication node.

FIG. 4 is a schematic diagram showing a path switching function in each of the communication nodes. Here, a portion of a path switching circuit in the case where three input lines and three output lines are connected is depicted.

This communication node comprises optical splitters 1-1 to 1-3, and optical switches 2-1 to 2-3. Each of the optical splitters 1-1 to 1-3 is an optical device that splits an input optical signal, and can be implemented, for example, by an optical coupler. The optical splitter 1-1 splits an input signal, and guides the split signals to the optical switches 2-2 and 2-3. The optical splitter 1-2 splits an input signal, and guides the split signals to the optical switches 2-1 and 2-3. Similarly, the optical splitter 1-3 splits an input signal, and guides the split signals to the optical switches 2-1 and 2-2. In the meantime, each of the optical switches 2-1 to 2-3 is an optical device that selects one of input optical signals in accordance with a control signal, and can be implemented, for example, by a 2×1 optical switch. The optical switch 2-1 selects one of the optical signals output from the optical splitters 1-2 and 1-3. The optical switch 2-2 selects one of the optical signals output from the optical splitters 1-1 and 1-3. Similarly, the optical switch 2-3 selects one of the optical signals output from the optical splitters 1-1 and 1-2.

Each of the communication nodes switches a route for transmitting a digital wrapper frame by suitably controlling the states of the optical switches 2-1 to 2-3. As described above, a communication node according to the preferred embodiment can switch a route for transmitting a digital wrapper frame irrespective of the type or the attribute of data stored in a payload of a digital wrapper frame, whereby signals of different communication methods can be made to coexist within one network. The control signal for controlling the optical switches 2-1 to 2-3 will be described later.

Figure 5:
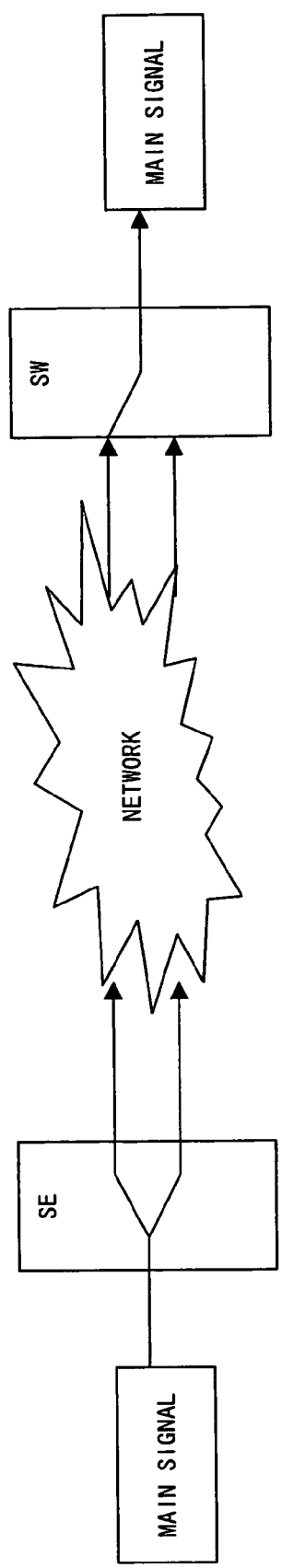
FIG. 5 is a schematic diagram showing a light guard system.

The path switching function shown in FIG. 4 can be implemented, for example, by using an existing light guard system. Here, the "light guard system" is a system for configuring an optical communications network in a redundant manner as shown in FIG. 5. This system comprises: an optical device (SE) that splits an optical signal output from a transmission station, and guides the split optical signals to dual optical transmission lines; and an optical switch (SW) that selects one of the optical signals transmitted via the dual optical transmission lines, and guides the selected signal to a reception station. In normal cases, a signal having a better quality among a pair of signals transmitted via the dual optical transmission lines is used. When a fault occurs on one of the dual optical transmission lines, a signal that is transmitted via the other transmission line on which the fault does not occur is used.

The path switching function of a communication node according to the preferred embodiment is implemented by using an optical device (SE) and an optical switch (SW) of the above described light guard system. At this time, in an existing light guard system, the optical device (SE) is used to split an input optical signal, and to guide the split signals to dual optical transmission lines. However, in a communication node according to the preferred embodiment, the optical device (SE) is used to split an input optical signal, and to guide the split signals to different output paths. Additionally, in the existing light guard system, the optical switch (SW) is used to select one of a pair of optical signals transmitted via the dual optical transmission lines. However, in the communication node according to the preferred embodiment, the optical switch (SW) is used to select one of optical signals input via different input paths. As described above, with the commercialized light guard units in the existing system, a path switching function can be implemented at low cost and with ease.

Figure 6:
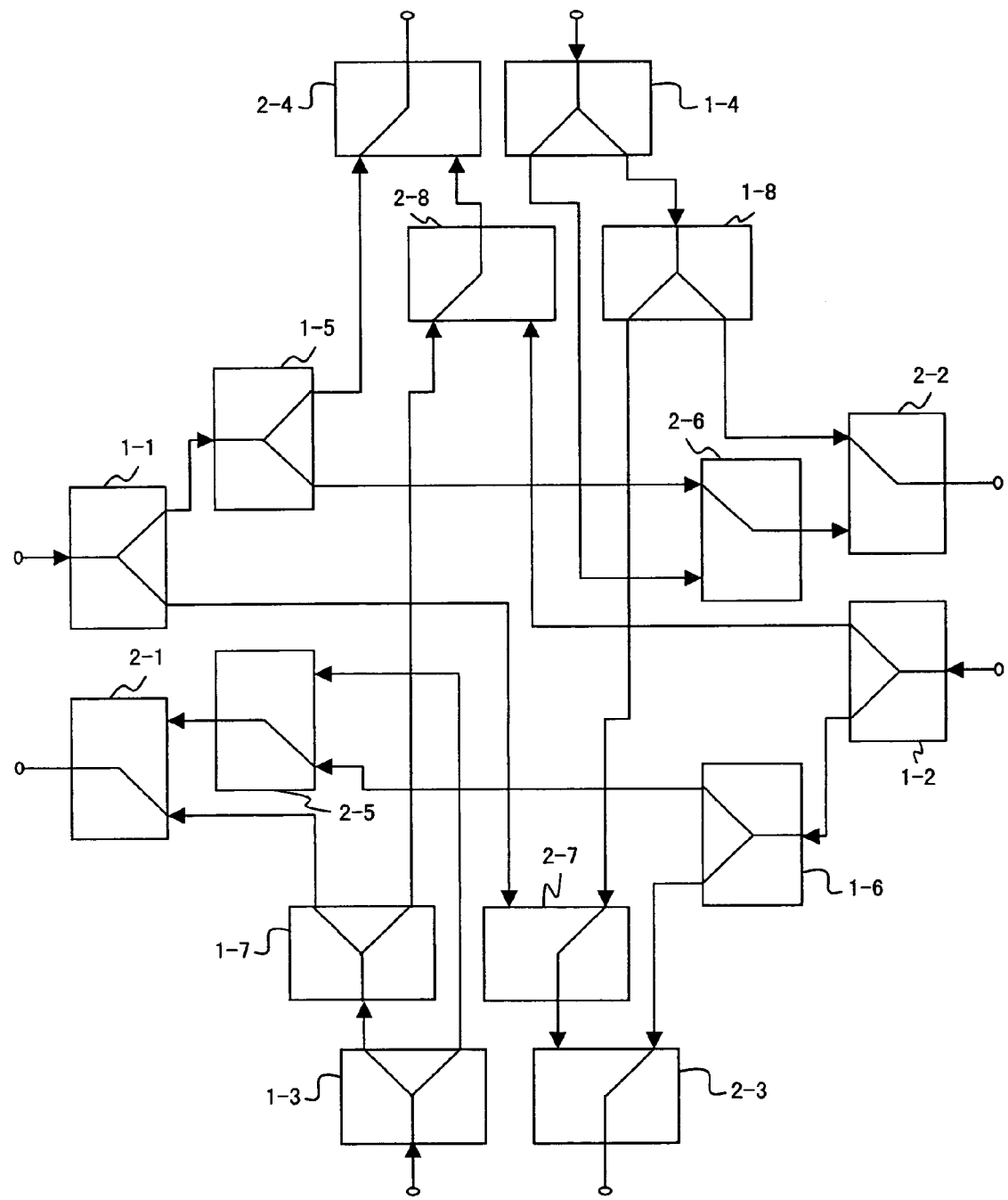
FIG. 6 explains a method adding lines of a communication node.

The example shown in FIG. 4 depicts the configuration of the communication node to which the three pairs of input and output lines are connected. However, each of the communication nodes can accommodate four or more pairs of input and output lines. For example, if four pairs of input and output lines are accommodated, a path switching function for guiding an optical signal from an arbitrary input line to an arbitrary output line is implemented by providing optical splitters 1-4 to 1-8 and optical switches 2-4 to 2-8 in addition to the above described optical splitters 1-1 to 1-3 and optical switches 2-1 to 2-3 as shown in FIG. 6. Namely, if a path switching function is implemented by using light guard units, lines can be easily added while utilizing existing equipment.

Figure 7:
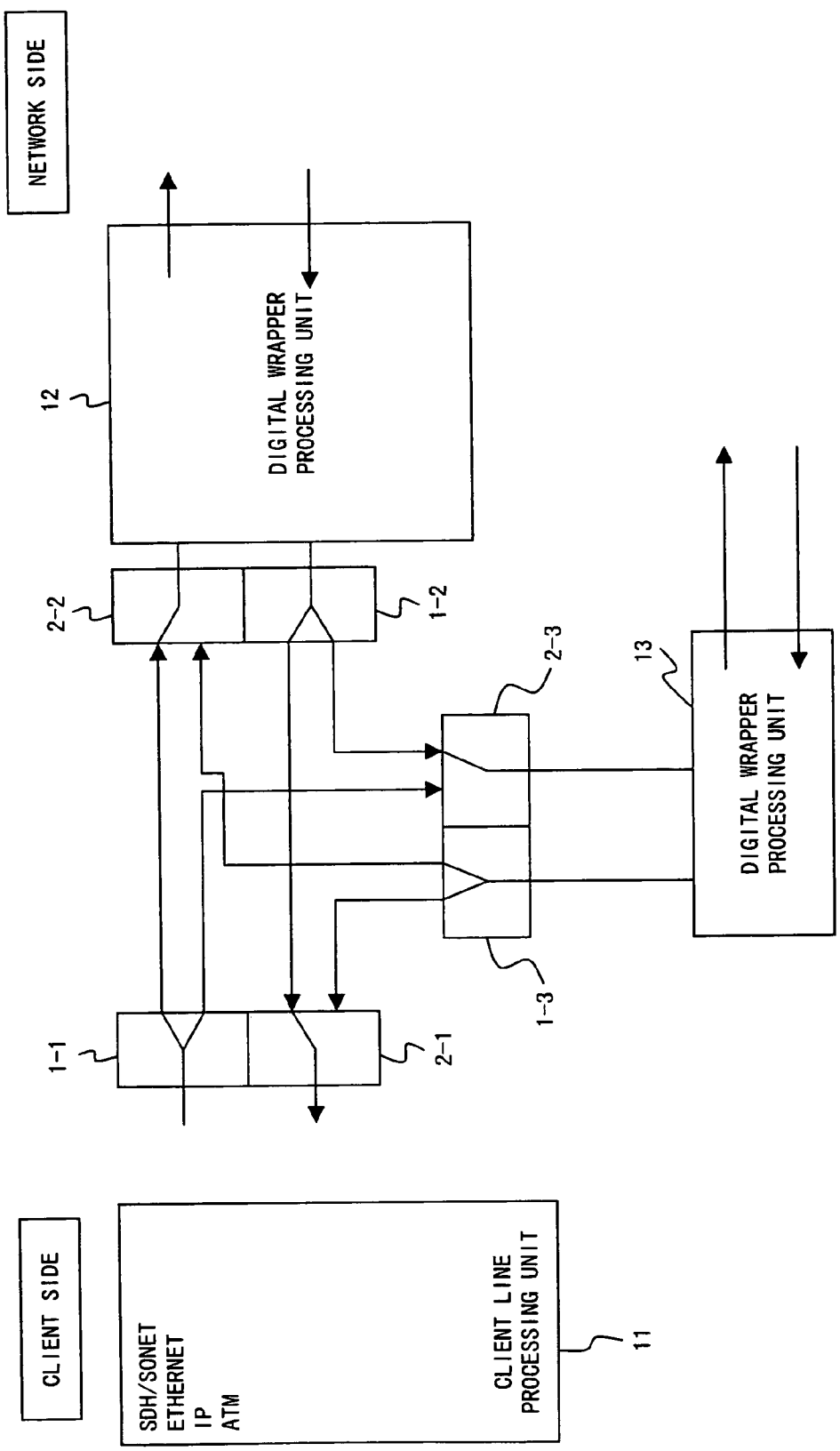
FIG. 7 shows the configuration of a communication node.

FIG. 7 shows the configuration of a communication node. Here, it is assumed that one pair of client lines, and two pairs of digital wrapper lines are connected to this communication node. Optical splitters 1-1 to 1-3, and optical switches 2-1 to 2-3 are as described above with reference to FIG. 4.

A client line processing unit 11 is connected to the optical splitter 1-1 and the optical switch 2-1, and a pair of client lines are connected to the client line processing unit 11. Here, although the client lines are not particularly limited, they are, for example, SDH lines, SONET lines, Ethernet lines, IP lines, or ATM lines. The client line processing unit 11 terminates a signal and data, which are transmitted via a client line, creates a digital wrapper frame the payload of which stores the data, and passes the created frame to the optical splitter 1-1. Additionally, the client line processing unit 11 extracts data from a digital wrapper frame selected by the optical switch 2-1, and guides the data to a client line.

Each of digital wrapper processing units 12 and 13 terminates the overhead of a digital wrapper frame received from the digital wrapper network, and passes the frame to a corresponding optical splitter 1-2 or 1-3. Furthermore, after performing a predetermined process for the overhead of a digital wrapper frame selected by the corresponding optical switch 2-2 or 2-3, the digital wrapper processing units 12 or 13 transmits the frame to the digital wrapper network.

The example shown in FIG. 7 assumes a communication node (such as the communication node A, D, F, or I in FIG. 1) that accommodates client lines. However, for a communication node that does not accommodate client lines (such as the communication node B, C, E, G, or H), a digital wrapper processing unit may be provided as a replacement for a client line processing unit.

Figure 8:
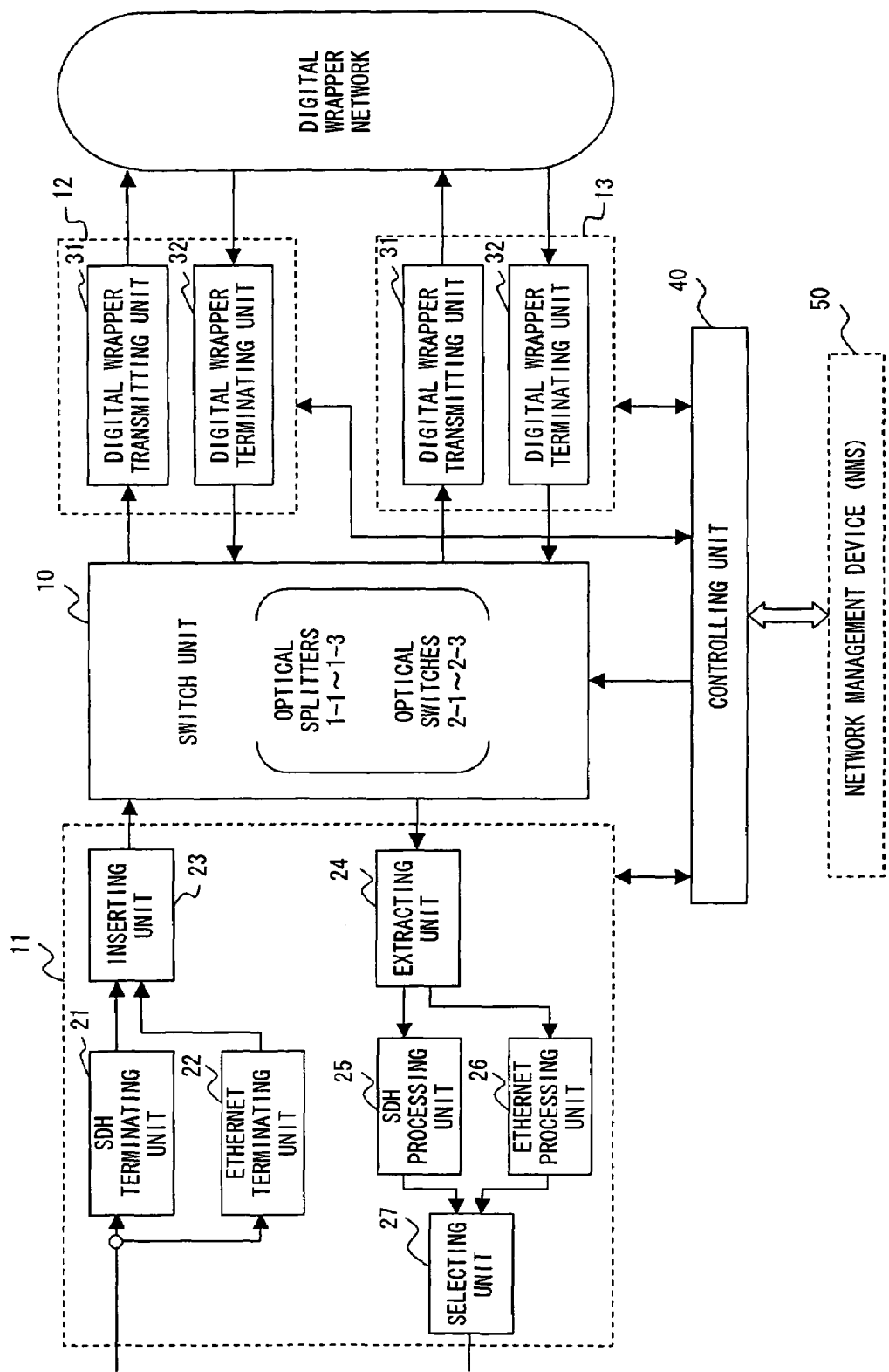
FIG. 8 shows a specific configuration of a communication node.

FIG. 8 shows a specific configuration of a communication node. Here, it is assumed that one pair of client lines, and two pairs of digital wrapper lines are connected in a similar manner as in the example shown in FIG. 7. It is also assumed that an SDH frame or an Ethernet packet is transmitted/received via the client lines.

An SDH terminating unit 21 terminates an SDH frame upon receipt of the SDH frame via a client line. In the meantime, an Ethernet terminating unit 22 terminates an Ethernet packet upon receipt of the Ethernet packet via the client line. An inserting unit 23 inserts the SDH frame terminated by the SDH terminating unit 21 or the Ethernet packet terminated by the Ethernet terminating unit 22 in a payload of a digital wrapper frame, and passes the digital wrapper frame to a switch unit 10.

The switch unit 10 comprises optical splitters 1-1 to 1-3 and optical switches 2-1 to 2-3, which are described with reference to FIG. 4. The switch unit 10 performs a routing process for a digital wrapper frame between a client line processing unit 11 and a digital wrapper processing unit 12 or 13 in accordance with an instruction from a controlling unit 40. Accordingly, a digital wrapper frame created by the client line processing unit 11 is guided to the digital wrapper processing unit 12 or 13. Additionally, the client line processing unit 11 receives a digital wrapper frame that the digital wrapper processing unit 12 or 13 receives from a digital wrapper network.

An extracting unit 24 extracts data (an SDH frame or an Ethernet packet) from a payload of a digital wrapper frame received via the switch unit 10. If an SDH frame is stored in the digital wrapper frame, a data process is executed by an SDH processing unit 25. Or, if an Ethernet packet is stored in the digital wrapper frame, a data process is executed by an Ethernet processing unit 26. Then, a selecting unit 27 selects one of the SDH frame processed by the SDH processing unit 25 and the Ethernet packet processed by the Ethernet processing unit 26, and guides the selected frame or packet to a client line.

A digital wrapper transmitting unit 31 adds an overhead and an error correction code to a digital wrapper frame, or updates an overhead and an error correction code, which are added to a digital wrapper frame, and transmits the frame to the digital wrapper network. A digital wrapper terminating unit 32 terminates a digital wrapper frame received from the digital wrapper network.

In the example shown in FIG. 8, the inserting unit 23 and the extracting unit 24 are provided in the client line processing unit 11. However, the present invention is not limited to this configuration. That is to say, the inserting unit 23 and the extracting unit 24 may be provided in the digital wrapper processing units 12 and 13.

The controlling unit 40 comprises a DCC (Data Communication Channel) of SDH/SONET, or a function equivalent thereto, and transmits/receives a message and control information to/from another communication node (or a network management device 50 to be described later). Here, the DCC is a function for making a communication for each section by using a D1/D2/D3 byte within an overhead of an SDH/SONET signal. The DCC can also make a faster communication by using D4 to D12 bytes within the overhead of the SDH/SONET signal. The digital wrapper technology, which is currently under study in ITU-T G709, plans to adopt the DCC of SDH/SONET or a function equivalent thereto. As described above, each of the communication nodes transmits/receives a message and control information to/from another communication node by using the DCC or a function equivalent thereto. Additionally, the controlling unit 40 notifies the network management device 50 of the connection state of the digital wrapper network and fault information, and controls the path switching operation of the switch unit 10 in accordance with an instruction from the network management device 50.

Figure 9:
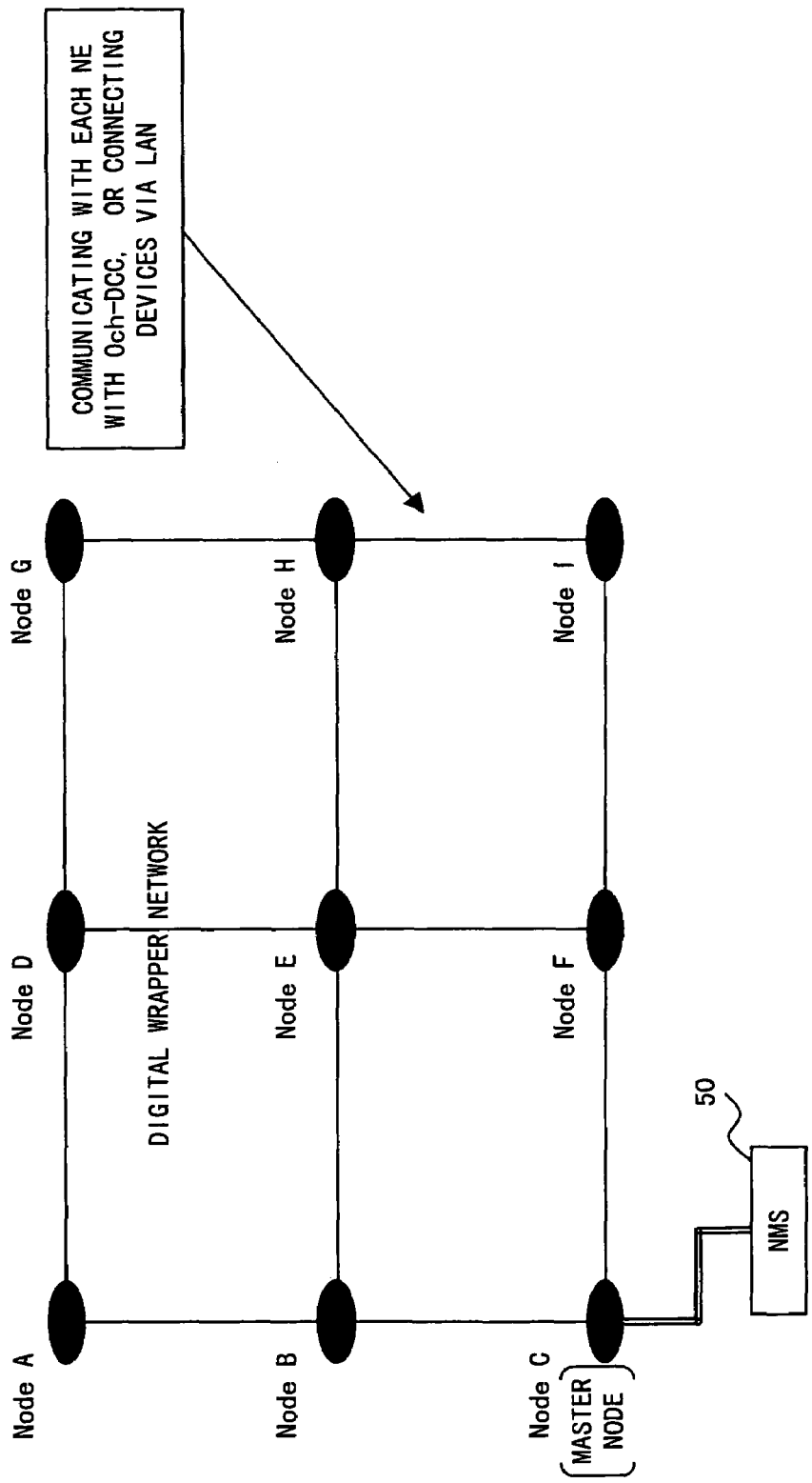
FIG. 9 shows a connection form of a network management device.

The network management device (NMS: Network Management System) 50 is a computer that manages the whole of a digital wrapper network. As shown in FIG. 9, the network management device 50 is connected to an arbitrary communication node among the plurality of communication nodes that configure the digital wrapper network. In the example shown in FIG. 9, the network management device 50 is connected to the communication node C. Hereinafter, the communication node to which the network management device 50 is connected is sometimes referred to as a "master node". It is not always necessary to implement the network management device 50 with one computer. The network management device 50 may be implemented with a plurality of computers that are arranged in a distributed manner.

Between the network management device 50 and the master node, information is transmitted/received, for example, via an RS-232C, LAN communication, etc., although the transmitting method is not particularly limited. Additionally, a communication between the network management device 50 and the other communication nodes is fundamentally made via the master node. Namely, when a message is transmitted from the network management device 50 to a certain communication node, the message is transferred from the master node to the destination node via the DCC after being transmitted from the network management device 50 to the master node via an RS-232C or LAN communication. Or, when information is transmitted from a certain communication node to the network management device 50, the information is transferred from the master node to the network management device 50 via an RS-232C or LAN communication after being transmitted from the communication node to the master node via a DCC.

A controlling unit 40 of each of the communication nodes (including the master node) detects an adjacent communication node in the digital wrapper network. Specifically, the controlling unit 40 can detect an adjacent communication node, for example, by using an empty area within an overhead of a digital wrapper frame, and by transmitting/receiving a node ID to/from a controlling unit 40 of another communication node. Here, the "node ID" is identification information that is uniquely assigned to each of the communication nodes. In this way, for example, the communication node A detects that it is adjacent to the communication nodes B and D. Besides, the communication node B detects that it is adjacent to the communication nodes A, C, and E.

The controlling unit 40 of each of the communication nodes notifies the network management device 50 of adjacent nodes detected with the above described procedures. At this time, this information is transferred from the master node to the network management device 50 via an RS-232C, LAN communication, etc. after being transmitted to the master node via a DCC as described above. The controlling unit 40 of each of the communication nodes may transmit the information spontaneously or in response to a request from the network management device 50.

The network management device 50 collects information transmitted from the communication nodes, and recognizes the topology of the digital wrapper network. Specifically, the network management device 50 creates a mesh table shown in FIG. 10. To the mesh table, information (topology information) representing to which communication nodes each of the communication nodes configuring the digital wrapper network is connected is registered. To the mesh table shown in FIG. 10, information representing the configuration of the digital wrapper network shown in FIG. 9 is registered. Namely, the mesh table shown in FIG. 10 represents, for example, that the communication node A is connected to the communication nodes B and D, and the communication node B is connected to the communication nodes A, C, and E.

Additionally, the network management device 50 manages paths set up on the digital wrapper network by using a route table shown in FIG. 11. The route table shown in FIG. 11 represents the state where paths shown in FIG. 12 are registered. Namely, in this implementation example, a route that reaches from the communication node A to the communication node F via the communication nodes B and E is registered to implement a communication between an SDH device 61 accommodated by the communication node A and an SDH device 62 accommodated by the communication node F, and at the same time, a route that reaches from the communication node D to the communication node I via the communication nodes G and H is registered to implement a communication between an Ethernet device 63 accommodated by the communication node D and an Ethernet device 64 accommodated by the communication node I.

These routes are set up by the network management device 50. The network management device 50 recognizes routes that can be set up between communication nodes by developing the mesh table shown in FIG. 10, and manages the number of hops on each of the routes (or the number of communication nodes existing on a path). For example, the following routes can be set up between the communication nodes A and F. A route 01: A-B-C-F (the number of hops=3), a route 02: A-B-E-F (the number of hops=3), a route 03: A-D-E-F (the number of hops=3), a route 04: A-B-E-H-I-F (the number of hops=5), a route 05: A-D-E-B-C-F (the number of hops=5), a route 06: A-D-E-H-I-F (the number of hops=5), a route 07: A-D-G-H-E-F (the number of hops=5), a route 08: A-D-G-H-I-F (the number of hops=5). Subsequent routes are omitted.

Additionally, the following routes can be set up between the communication nodes D and I. A route 11: D-E-F-I (the number of hops=3), a route 12: D-E-H-I (the number of hops=3), a route 13: D-G-H-I (the number of hops=3), a route 14: D-A-B-C-F-I (the number of hops=5), a route 15: D-A-B-E-F-I (the number of hops=5), a route 16: D-A-B-E-H-I (the number of hops=5), a route 17: D-E-B-C-F-I (the number of hops=5), a route 18: D-G-H-E-F-I (the number of hops=5). Subsequent routes are omitted.

Here, assume that a route for transmitting/receiving an SDH frame between the SDH devices 61 and 62 is set up, and then a route for transmitting/receiving an Ethernet packet between the Ethernet devices 63 and 64 is set up.

In this case, the network management device 50 selects the shortest route from among the above described plurality of routes that can be set up between the communication nodes A and F. Here, the "route 02" is assumed to be selected from among the routes having the number of hops=3. Then, the network management device 50 rewrites the state of the line between the communication nodes A and B, the state of the line between the communication nodes B and E, and the state of the line between the communication nodes E and F from "unused" to "in use" in the route table as shown in FIG. 11. Next, the network management device 50 selects the shortest route from among the above described plurality of routes that can be set up between the communication nodes D and I.

However, since the line between the communication nodes E and F is already used for the other communication route, the "route 11" cannot be selected. Accordingly, the "route 13" is assumed to be selected from among the routes having the number of hops=3 here. Then, the network management device 50 rewrites the state of the line between the communication nodes D and G, the state of the line between the communication nodes G and H, and the state of the line between the communication nodes H and I from "unused" to "in use" in the route table as shown in FIG. 11. In this way, registration to the route table shown in FIG. 11 is completed.

When the network management device 50 updates the route table in accompaniment with the set-up of the communication routes, it gives an instruction for implementing the signal transmission shown in FIG. 12 to each of the communication nodes. Upon receipt of the instruction from the network management device 50, the controlling unit 40 of each of the communication nodes controls the state of the switch unit 10 (the respective optical switches shown in FIG. 4 or 6) in accordance with the instruction. As a result, the communication node A is made to store an SDH frame transmitted from the SDH device 61 in a payload of a digital wrapper frame, and to transmit the frame to the communication node B. Additionally, the communication node B is made to transfer the digital wrapper frame transmitted from the communication node A to the communication node E. Then, the communication node E is made to transfer the digital wrapper frame to the communication node F. Next, the communication node F is made to extract the SDH frame from the payload of the digital wrapper frame transmitted from the communication node E, and to transmit the extracted SDH frame to the SDH device 62. Note that this operation is the same also when an SDH frame transmitted from the SDH device 62 is transferred to the SDH device 61.

In the meantime, the communication node D is made to store an Ethernet packet transmitted from the Ethernet device 63 in a payload of a digital wrapper frame, and to transmit the frame to the communication node G. The communication node G is made to transfer the digital wrapper frame transmitted from the communication node D to the communication node H. Then, the communication node H is made to transfer the digital wrapper frame to the communication node I. Next, the communication node I is made to extract the Ethernet packet from the payload of the digital wrapper frame transmitted from the communication node H, and to transmit the extracted packet to the Ethernet device 64. This operation is the same also when an Ethernet packet transmitted from the Ethernet device 64 is transferred to the Ethernet device 63.

As described above, in the digital wrapper network according to this embodiment, data of any communication method is stored in a digital wrapper frame and transmitted. Accordingly, networks of different communication methods can be made to coexist in one network. Additionally, communication routes provided on a digital wrapper network are managed by the network management device 50 in a centralized manner, so that their set up/change is made with ease and with high efficiency.

Figure 13:
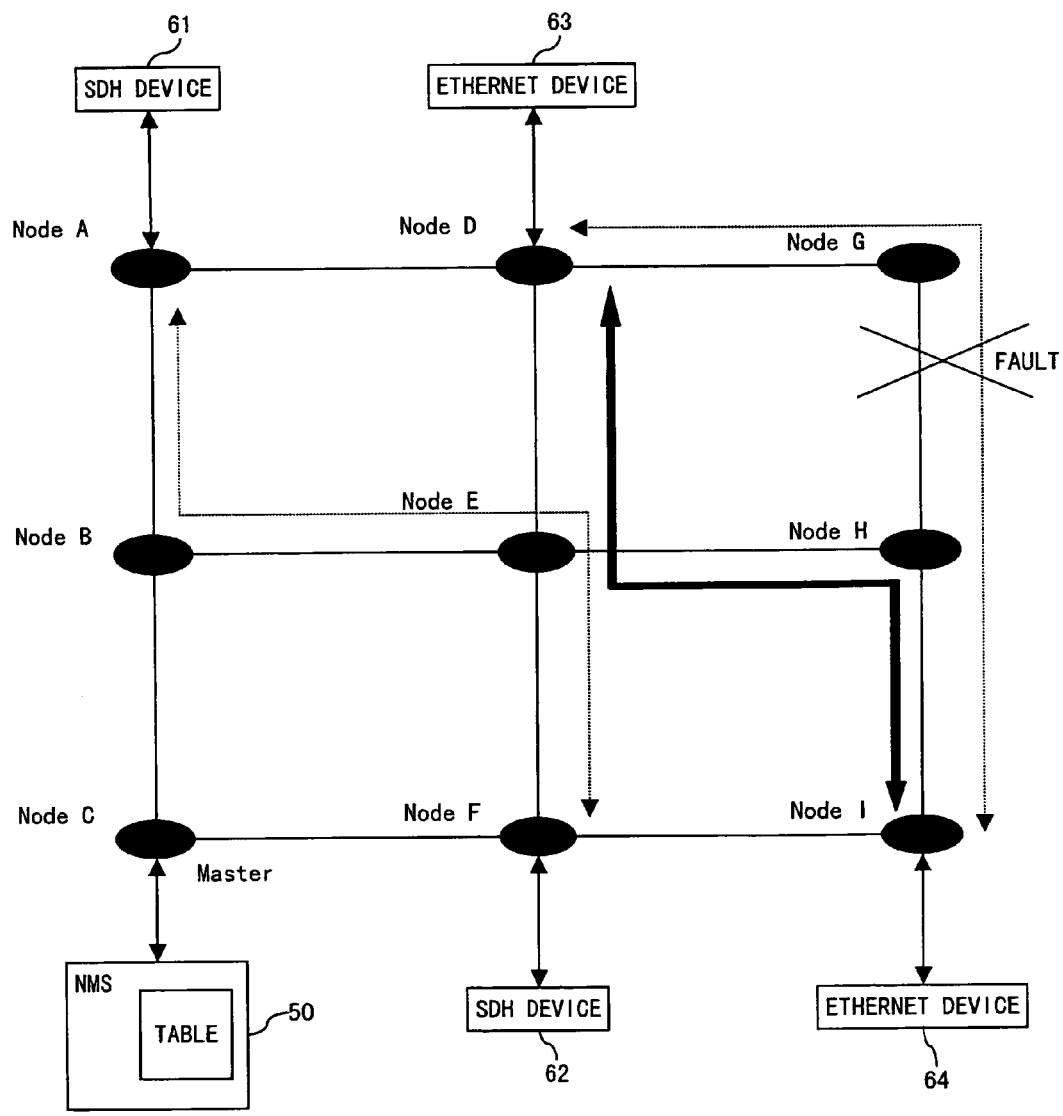
FIG. 13 explains the operations for resetting up a route when a fault occurs.

An operation for restoring a fault that occurs on the digital wrapper network is described next. Here, assume that a fault occurs on the line between the communication nodes G and H, when the communication route which passes through the communication nodes A, B, E and F between the SDH devices 61 and 62 is set up, and also the communication route which passes through the communication nodes D, G, H, and I between the Ethernet devices 63 and 64 is set up as shown in FIG. 13. The mesh table and the route table are respectively in the states shown in FIGS. 10 and 11 when this fault occurs.

Once the fault occurs, the communication node G cannot receive a signal from the communication node H, and the communication node H cannot receive a signal from the communication node G. Then, the communication nodes G and H respectively notify the network management device 50 of this phenomenon. This information is notified, for example, via a DCC or a function equivalent thereto.

Upon detection that the fault occurs on the line between the communication nodes G and H, the network management device 50 attempts to reset up the route influenced by the fault. In this example, a bypass route is set up between the Ethernet devices 63 and 64. In this case, the network management device 50 first references the mesh table and the route table, and detects the shortest route from among the routes that do not use the line on which the fault occurs. At this time, a conflict with another communication route (the communication route between the SDH devices 61 and 62 here) is not permitted. Namely, the route that passes through the communication nodes D, E, F, and I cannot be set up. Accordingly, the network management device 50 selects the route that passes through the communication nodes D, E, H, and I as the communication route between the Ethernet devices 63 and 64 as shown in FIG. 13.

When the network management device 50 determines the new route as described above, it updates the route table as shown in FIG. 14. Then, the network management device 50 gives instructions for switching to establish the new route to the corresponding nodes (the communication nodes D, E, and H here). Specifically, an instruction for "mutually connecting the client line and the line DE) is given to the communication node D. Additionally, an instruction for "mutually connecting the line BE and the line EF, and for mutually connecting the line DE and the line EH" is given to the communication node E. Furthermore, an instruction for "mutually connecting the line EH and the line HI" is given to the communication node H. At this time, after these instructions are transmitted from the network management device 50 to the master node, they are notified from the master node to the corresponding communication nodes via a DCC or a function equivalent thereto. Then, these communication nodes respectively control the state of the switch unit 10 (the optical switches shown in FIG. 4 or 6) in accordance with the given instructions. As a result, the communication shown in FIG. 13 is implemented. That is, the communication between the Ethernet devices 63 and 64 is restored.

FIG. 15 shows the format of a digital wrapper frame according to another embodiment of the present invention. A payload of a digital wrapper frame according to this embodiment is separated into a working system area and a standby system area. Namely, in this embodiment, each digital wrapper frame can simultaneously transmit working system data and standby system data. Note that the working system area and the standby system area are basically identical in size.

Figures 16A, 16B:
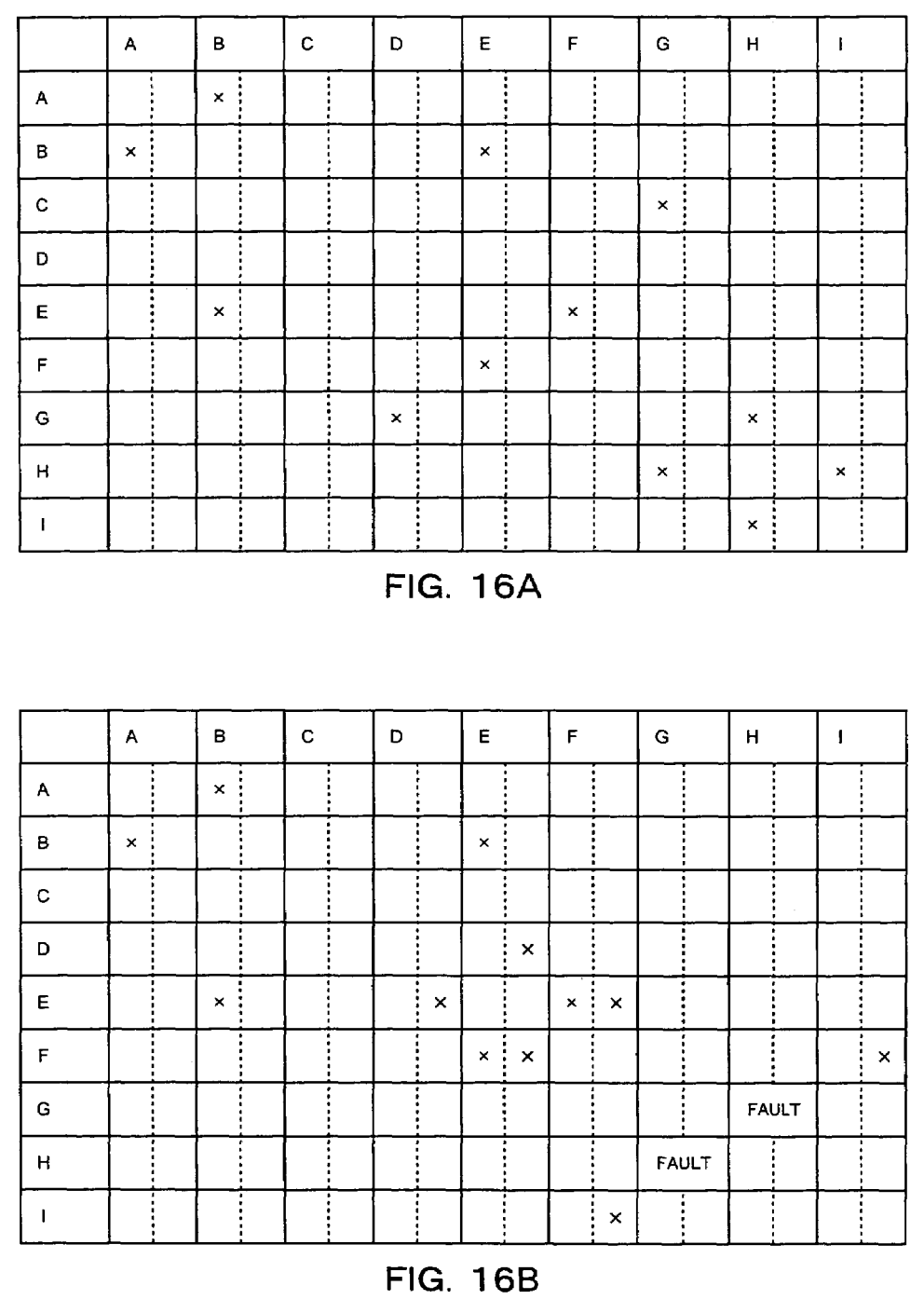
Figure 17:
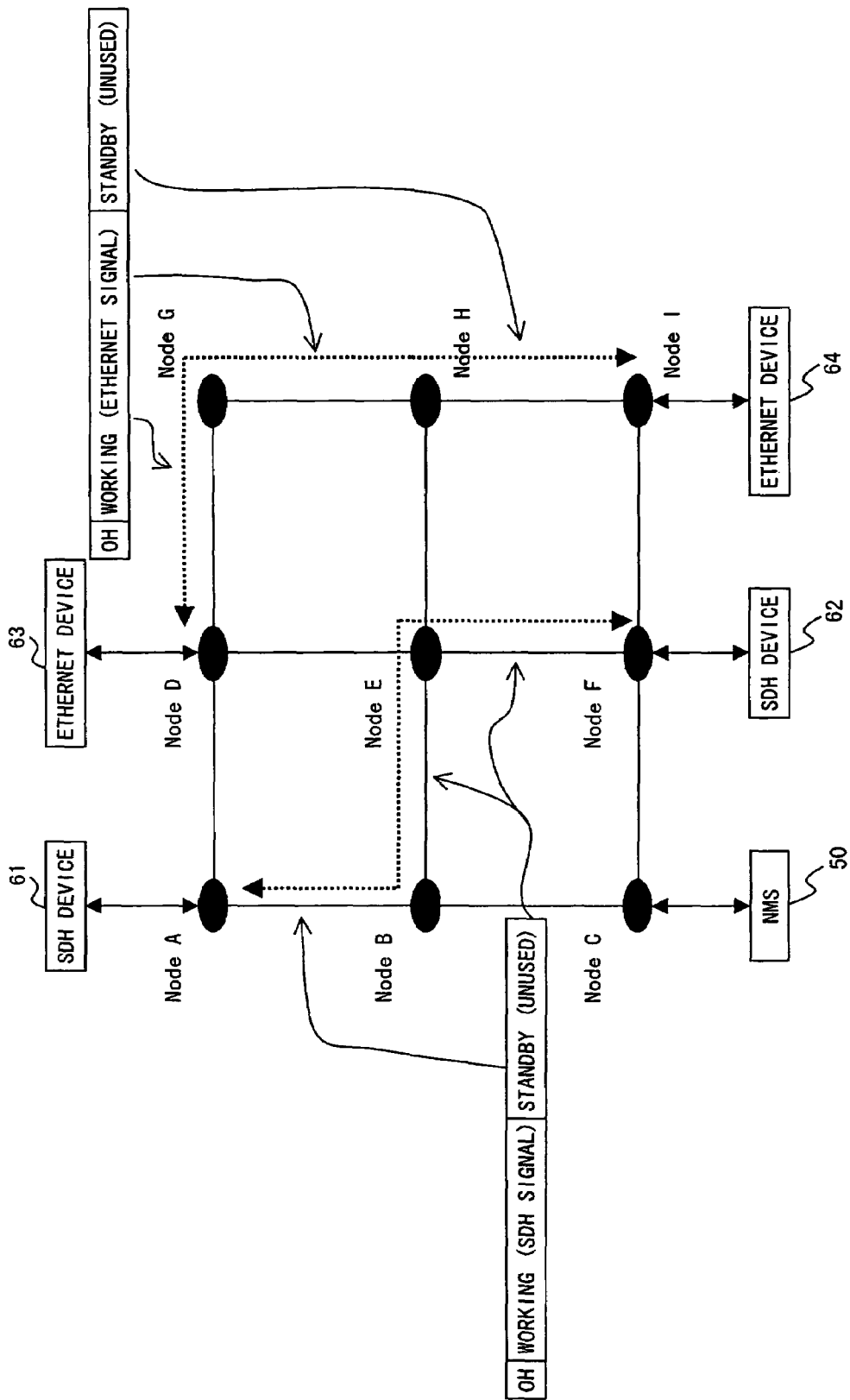
FIG. 17 exemplifies the state of a network according to the further preferred embodiment.

In this case, a route table provided in a network management device 50 individually manages the use states of the working system area and the standby system area for each line between communication nodes as shown in FIG. 16A. If the route table is set as shown in FIG. 16A, paths shown in FIG. 17 are set up on a digital wrapper network. Namely, an SDH frame transmitted between SDH devices 61 and 62 is stored in the working system area of a digital wrapper frame, and transmitted/received via communication nodes A, B, E, and F. In the meantime, an Ethernet packet transmitted between Ethernet devices 63 and 64 is stored in the working system area of the digital wrapper frame, and transmitted/received via communication nodes D, G, H, and I. As described above, the standby system area of a digital wrapper frame is not used in normal cases, and data is fundamentally stored in the working system area of the digital wrapper frame, and transmitted.

When a fault occurs on the digital wrapper network, the fault is notified to the network management device 50 in a similar manner as in the above described embodiment. When recognizing a location where the fault occurs, the network management device 50 updates the route table so as to restore the communication suspended by the fault. At this time, the standby system area of a digital wrapper frame is used. Namely, the network management device 50 references the mesh table and the route table, and selects the shortest path from among paths that can be set up.

Assume that a fault occurs on the line between the communication nodes G and H as shown in FIG. 18. In this case, the network management device 50 sets up, for example, the path that passes through the communication nodes D, E, F, and I by using the standby system area of a digital wrapper frame. Here, to make fault restoration shown in FIG. 18, the route table is updated to the state shown in FIG. 16B. Then, instructions for switching to the new path are given to the corresponding communication nodes in accordance with the updated route table, whereby the state shown in FIG. 18 is implemented.

In FIG. 18, an SDH frame is stored in the working system area of a digital wrapper frame, and transmitted between the communication nodes A and F via the communication nodes B and E. In the meantime, an Ethernet packet is stored in the standby system area of the digital wrapper frame, and transmitted between the communication nodes D and I via the communication nodes E and F. Accordingly, the SDH signal and the Ethernet signal are transmitted between the communication nodes E and F by using both of the working system area and the standby system area of the digital wrapper frame.

In this embodiment, each of the communication nodes changes the state of its switch unit 10 depending on which of data in the working system area of a digital wrapper frame and data in its standby system area is to be switched. Its example is shown below.

Figure 19A:
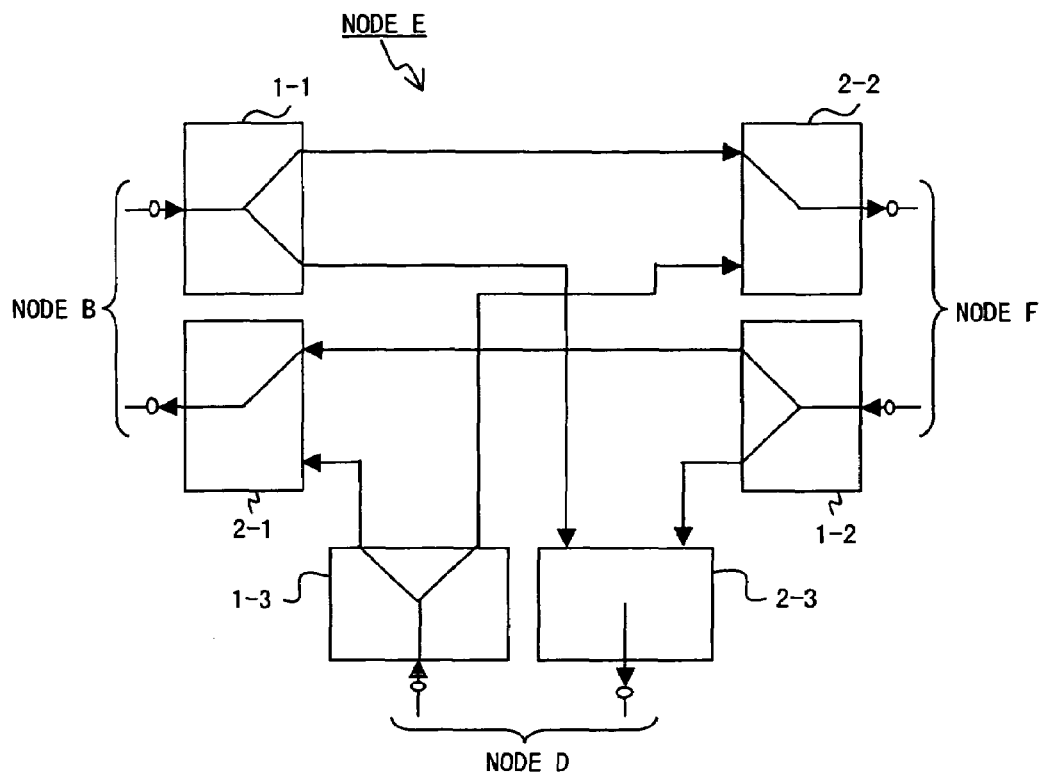
FIGS. 19A and 19B show the operations of a switch unit when a fault is restored.
Figure 19B:
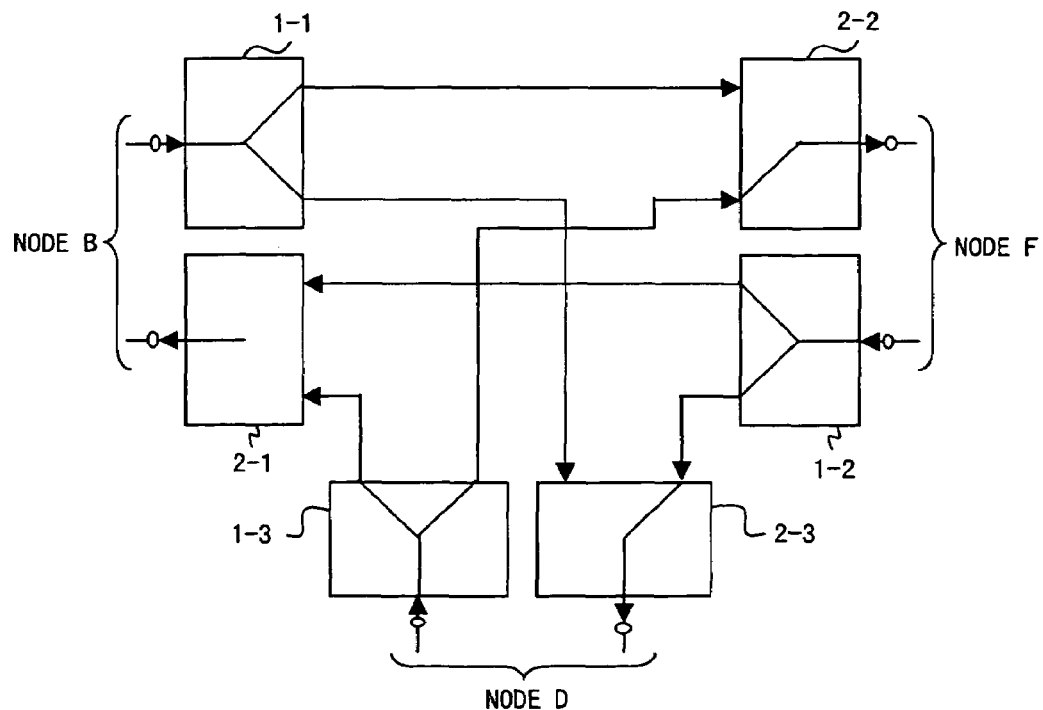

FIGS. 19A and 19B show the operations of the switch unit 10 of the communication node E in the state shown in FIG. 18. Since four pairs of input and output lines are connected to the communication node E, the switch unit 10 actually has the configuration shown in FIG. 6. However, part of the configuration is omitted here for ease of explanation.

The switch unit 10 of the communication node E is controlled to be in the state shown in FIG. 19A while the data in the working system area is switched. Namely, the optical switch 2-2 is controlled to guide an SDH frame transmitted from the communication node B to the communication node F, whereas the optical switch 2-1 is controlled to guide an SDH frame transmitted from the communication node F to the communication node B. In the meantime, the switch unit 10 of the communication node E is controlled to be in the state shown in FIG. 19B while the data in the standby system area is switched. Namely, the optical switch 2-2 is controlled to guide an Ethernet packet transmitted from the communication node D to the communication node F, whereas the optical switch 2-3 is controlled to guide an Ethernet packet transmitted from the communication node F to the communication node D.

Although descriptions of the operations of the other communication nodes are omitted, a method for controlling the switch unit 10 is fundamentally the same.

As described above, in this embodiment, a payload of a digital wrapper frame is separated into a working system area and a standby system area, and data is transmitted using the standby system area depending on need. As a result, a route can be reset up flexibly when a fault occurs. For instance, in the example shown in FIG. 13, the line between the communication nodes E and F is occupied to transmit a digital wrapper frame that stores an SDH frame. Therefore, a digital wrapper frame that stores an Ethernet packet cannot be transmitted via that line. In contrast, in the digital wrapper network according to this embodiment, two sets of signals can be transmitted via each line. Accordingly, if the standby system area of the payload of a digital wrapper frame is used when a fault occurs on the line between the communication nodes G and H as shown in FIG. 18, the digital wrapper frame that stores an Ethernet packet can be transmitted via the communication nodes D, E, F, and I, or via the communication nodes D, E, H, and I. Namely, the range of choices for restoring the fault is extended.

In the above described embodiment, a payload of a digital wrapper frame is separated into two areas. However, the present invention is not limited to this implementation. That is, a payload of a digital wrapper frame may be separated into three areas or more, and defined as a working system area, a first standby system area, a second standby system area, etc. Separating a payload of a digital wrapper frame into more areas in this way enhances the degree of freedom of setting up a bypass route for restoring a fault.

Figure 20:
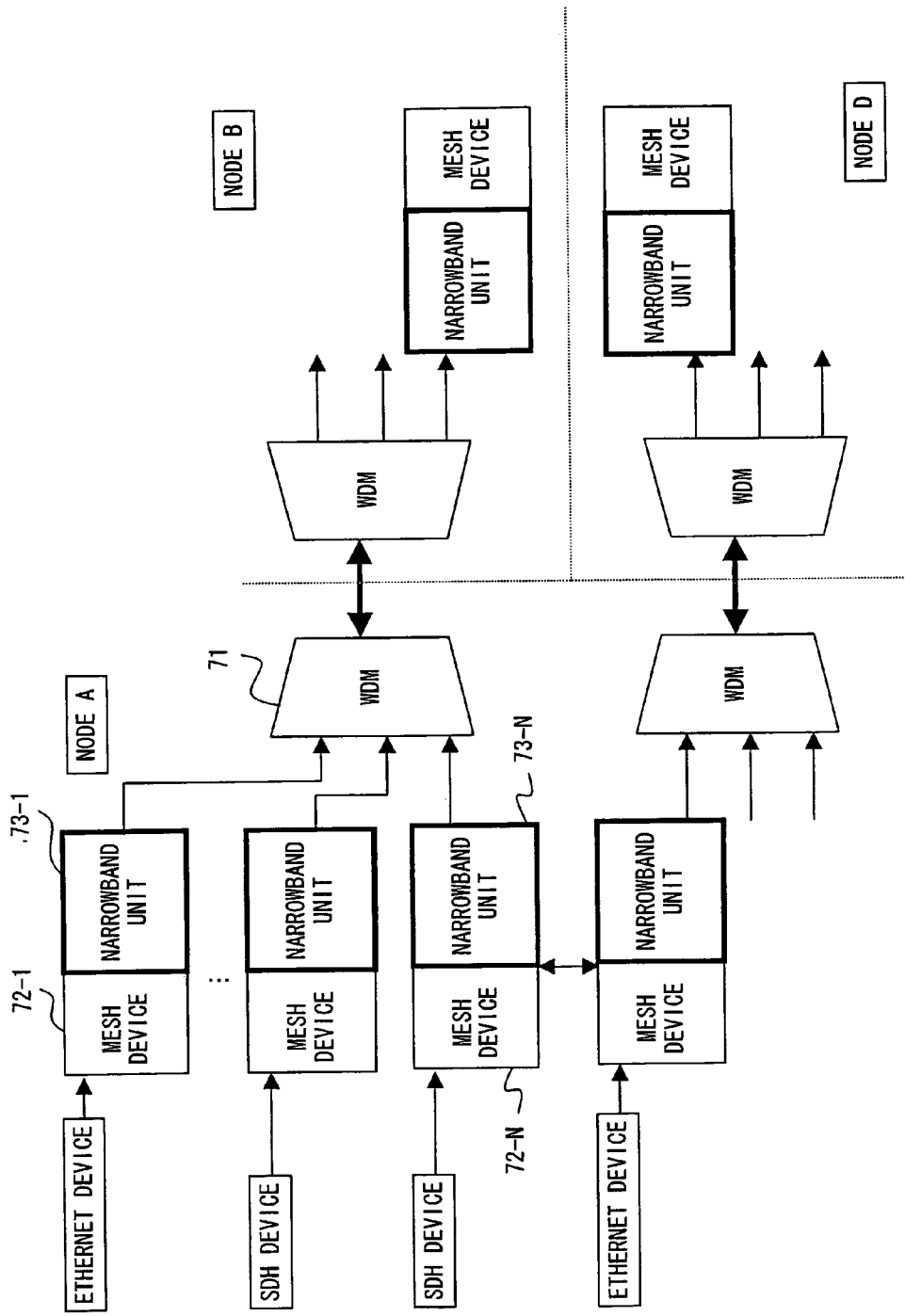
FIG. 20 shows an implementation example when the present invention is applied to a WDM communications system.

FIG. 20 shows another embodiment implemented when the present invention is applied to a WDM communications system. In this embodiment, each of the communication nodes comprises a WDM device 71, and transmits/receives a plurality of digital wrapper frames in parallel using a plurality of carrier waves with different wavelengths. In FIG. 20, each of mesh devices 72-1 to 72-N comprises a function for terminating a line, and a function for switching a transfer route of a signal, and its configuration is as shown in FIG. 8. Additionally, narrowband units 73-1 to 73-N respectively transmit digital wrapper frames output from the corresponding mesh devices 72-1 to 72-N with wavelengths λ1 to λn corresponding to the frequency grid of a WDM communication, which is stipulated by ITU-T.

With this configuration, an Ethernet packet transmitted/received between Ethernet devices, and an SDH frame transmitted/received between SDH devices are respectively stored in a payload of a digital wrapper frame, multiplexed by a WDM device 71, and transmitted in parallel. Accordingly, when a new path is set up, only a combination of a mesh device and a narrowband unit is added, so that the capacity of a line can be increased with ease.

Figure 21:
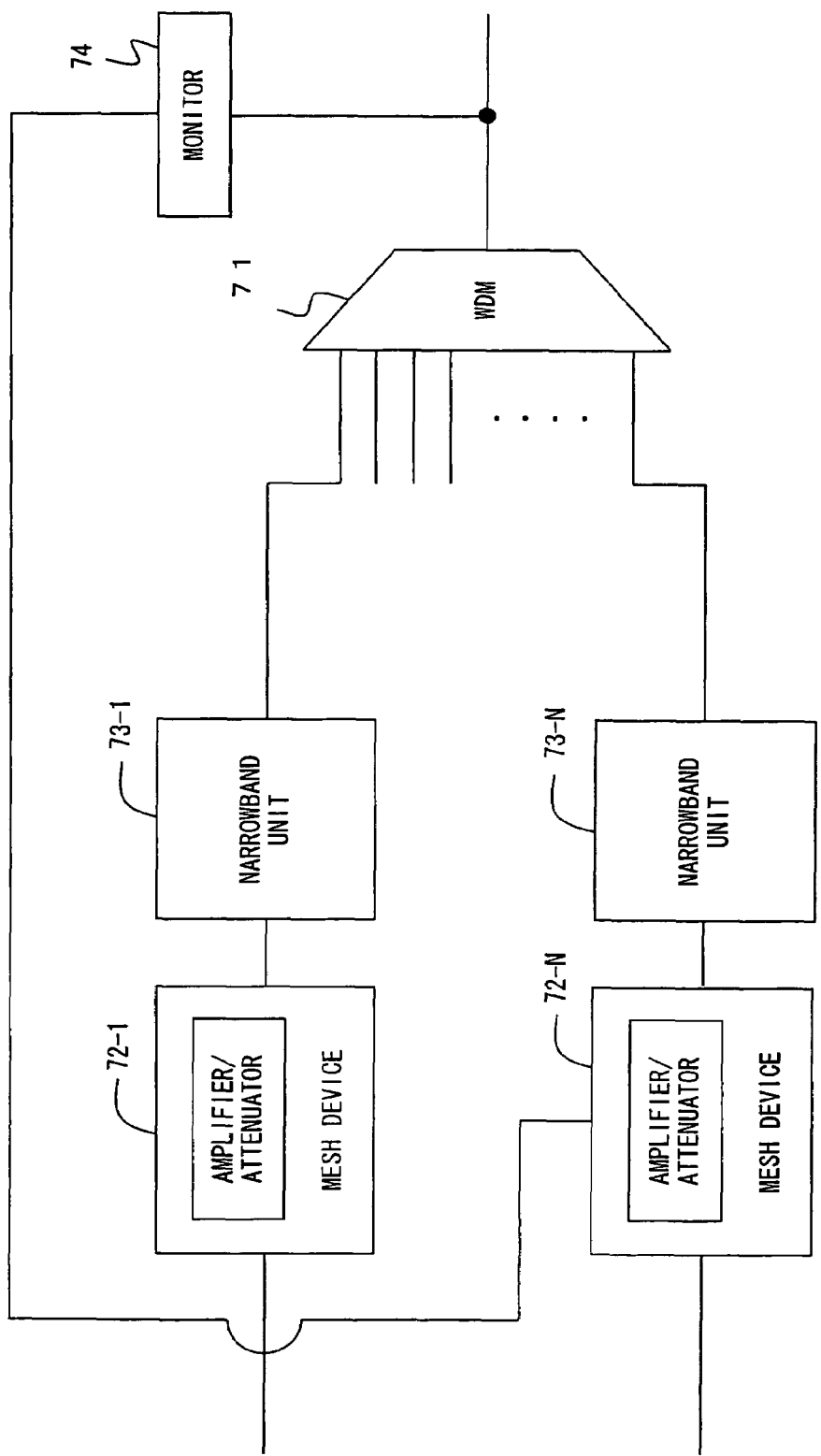
FIG. 21 explains a function for equalizing WDM light.

It is desirable that the optical powers of respective wavelengths are equalized in a WDM communications. Accordingly, in this embodiment, each of the mesh devices 72-1 to 72-N comprises an optical amplifier and/or an optical attenuator as shown in FIG. 21. Additionally, a power monitor 74 detects the optical powers of wavelengths multiplexed in WDM light. Based on a detection result of the power monitor 74, the gain of an optical amplifier and/or the attenuation amount of an optical attenuator, which are provided in each of the mesh devices 72-1 to 72-N, are dynamically controlled to equalize WDM light. As a result, the WDM light that transmits a plurality of digital wrapper frames in parallel is equalized, and an improvement in a bit error rate is expected.

Figure 22:
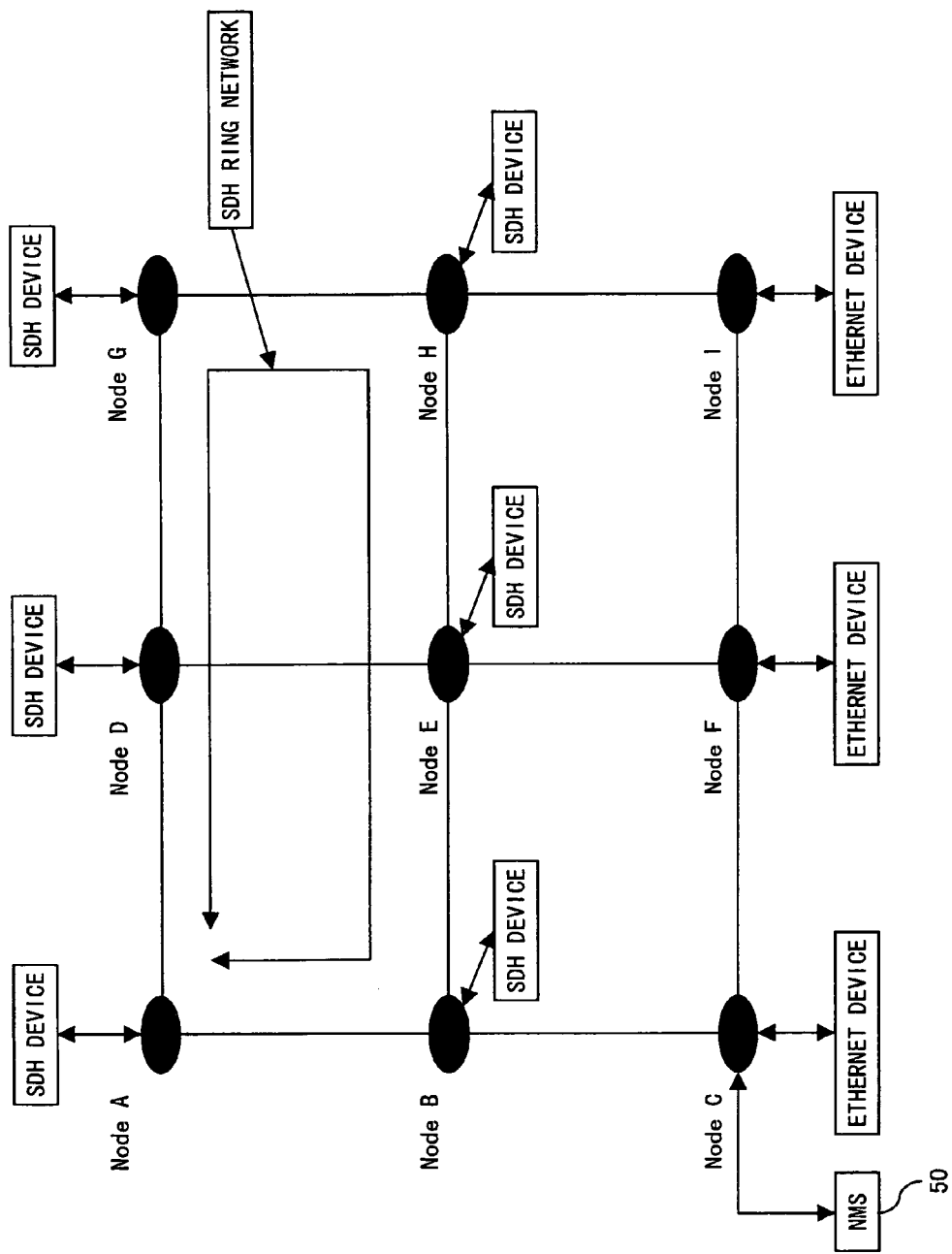
FIG. 22 shows the configuration of a network according to a further preferred embodiment of the present invention.

FIG. 22 shows the configuration of a network according to a further embodiment of the present invention. Here, SDH devices are respectively connected to communication nodes A, B, E, H, G, and D, which configure an SDH ring network. In the meantime, Ethernet devices are respectively connected to communication nodes C, F, and I, which configure an Ethernet system.

A network management device 50 comprises a mesh table and a route table in a similar manner as in the above described embodiments. However, as for the route table in this embodiment, not only routes on which paths are set up, but also the types of signals transmitted via the communication routes set up are registered as shown in FIG. 23. By way of example, for a line between the communication nodes A and B, information indicating that a digital wrapper frame storing an SDH frame is transmitted is registered. Furthermore, for a line between the communication nodes C and F, information indicating that a digital wrapper frame storing an Ethernet packet is transmitted is registered.

When a fault occurs on the above described digital wrapper network, the network management device 50 executes a restoration process by setting up a bypass route basically in a similar manner as in the above described embodiments. However, if a communication influenced by the fault comprises a self-restoration function, the network management device 50 does not execute the restoration process.

Figure 24:
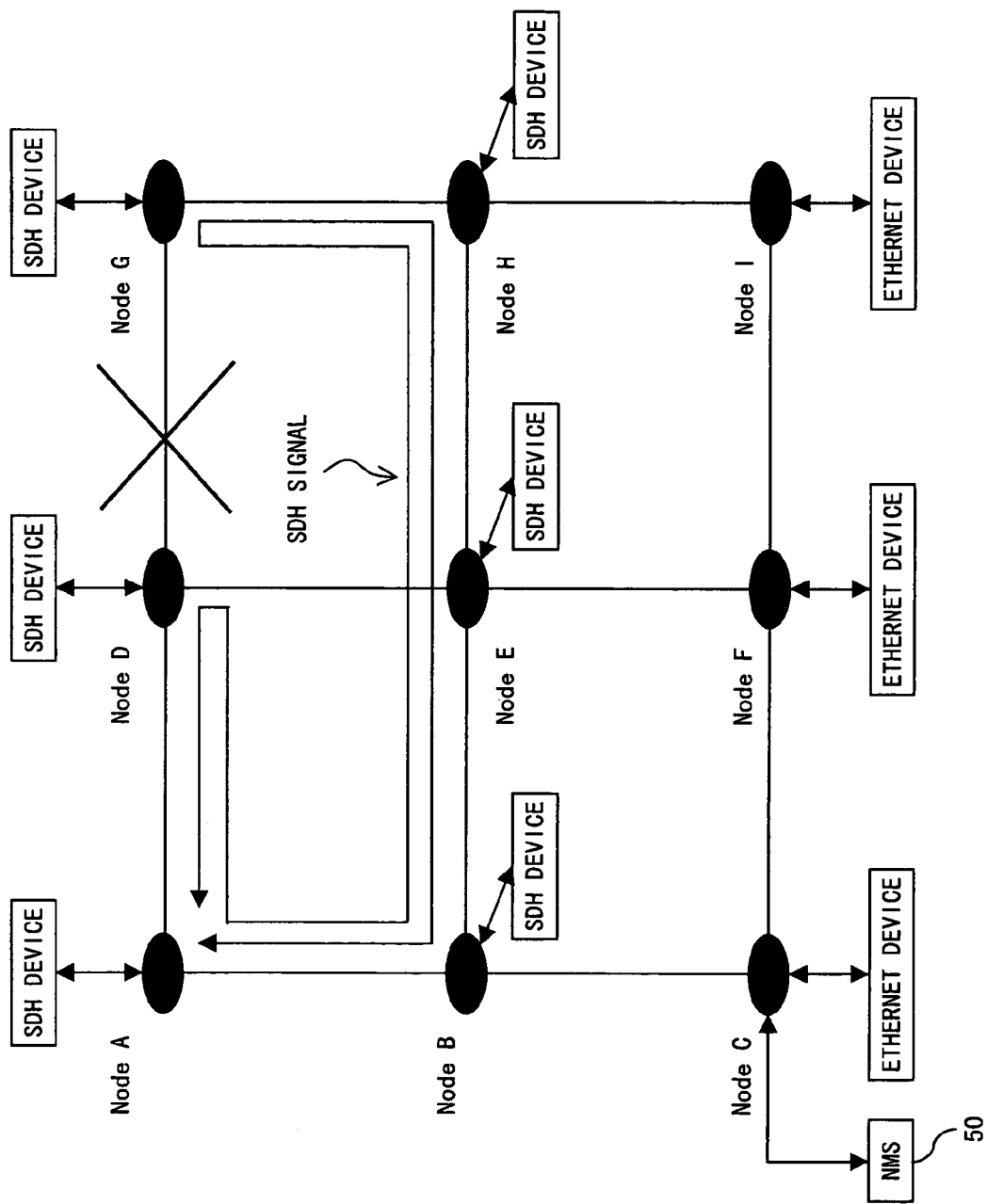
FIG. 24 is a diagram (No. 1) showing the operations performed when a fault is restored.

For example, when a fault occurs on a line between the communication nodes D and G that configure the SDH ring network as shown in FIG. 24, the SDH ring network executes a restoration process with the loop-back function according to SDH. Thus, the network management device 50 does not need to execute the restoration process for the fault in this case. Namely, the route table is not rewritten.

Figure 25:
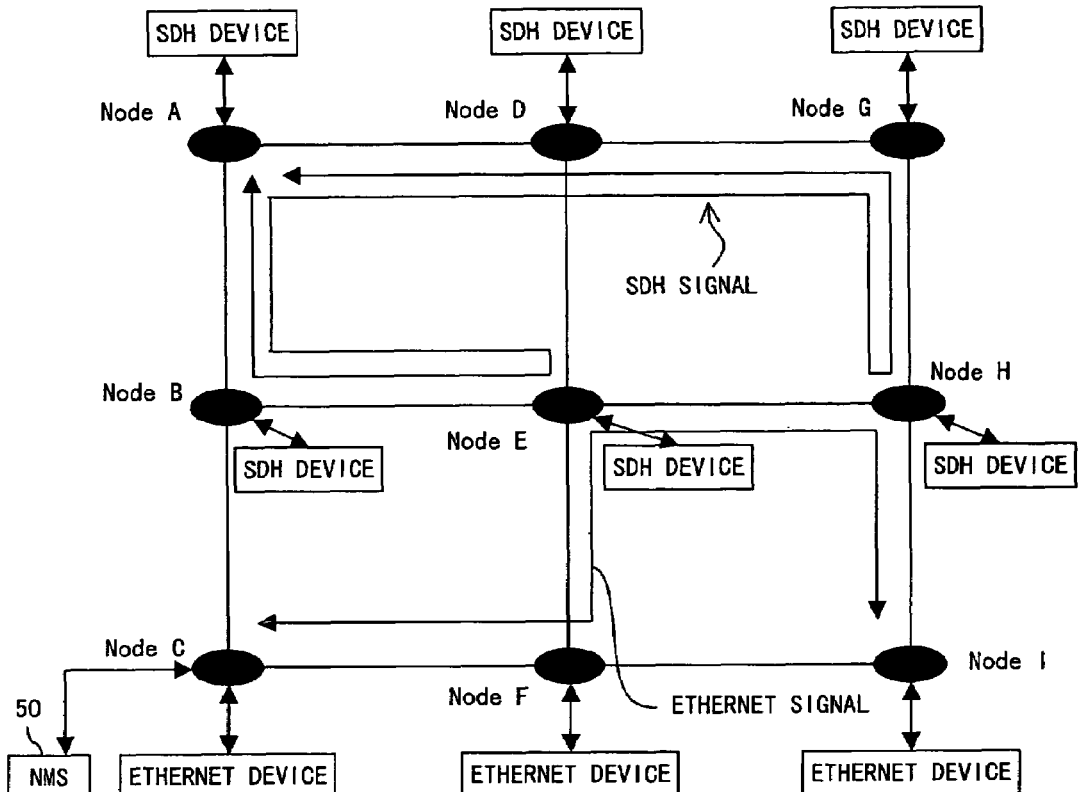
FIG. 25 is a diagram (No. 2) showing the operations performed when a fault is restored.

On the other hand, when a fault occurs on a line between the communication nodes F and I that configure the Ethernet system as shown in FIG. 25, the network management device 50 executes the restoration process for the fault. Specifically, a line between the communication nodes E and H, which is assigned to transmit a digital wrapper frame storing an SDH frame, is released. Additionally, a route that connects the communication nodes C and I via the communication nodes F, E, and H is assigned to transmit a digital wrapper frame storing an Ethernet packet. Then, this information is written to the route table. Note that the SDH ring network is self-restored with the loop-back function according to SDH, although a path between the communication nodes E and H is disconnected by the restoration process executed by the network management device 50.

As described above, the network management device 50 in this embodiment identifies the type of a communication influenced by a fault when the fault occurs on the digital wrapper network, determines whether or not to execute the restoration process according to an identification result, or selects a restoration method according to the identification result. Accordingly, the load imposed on the network management device 50 is reduced, and the amount of information transmitted/received or the number of information transmissions/receptions between the network management system 50 and each of the communication nodes can be decreased.

Figure 26:
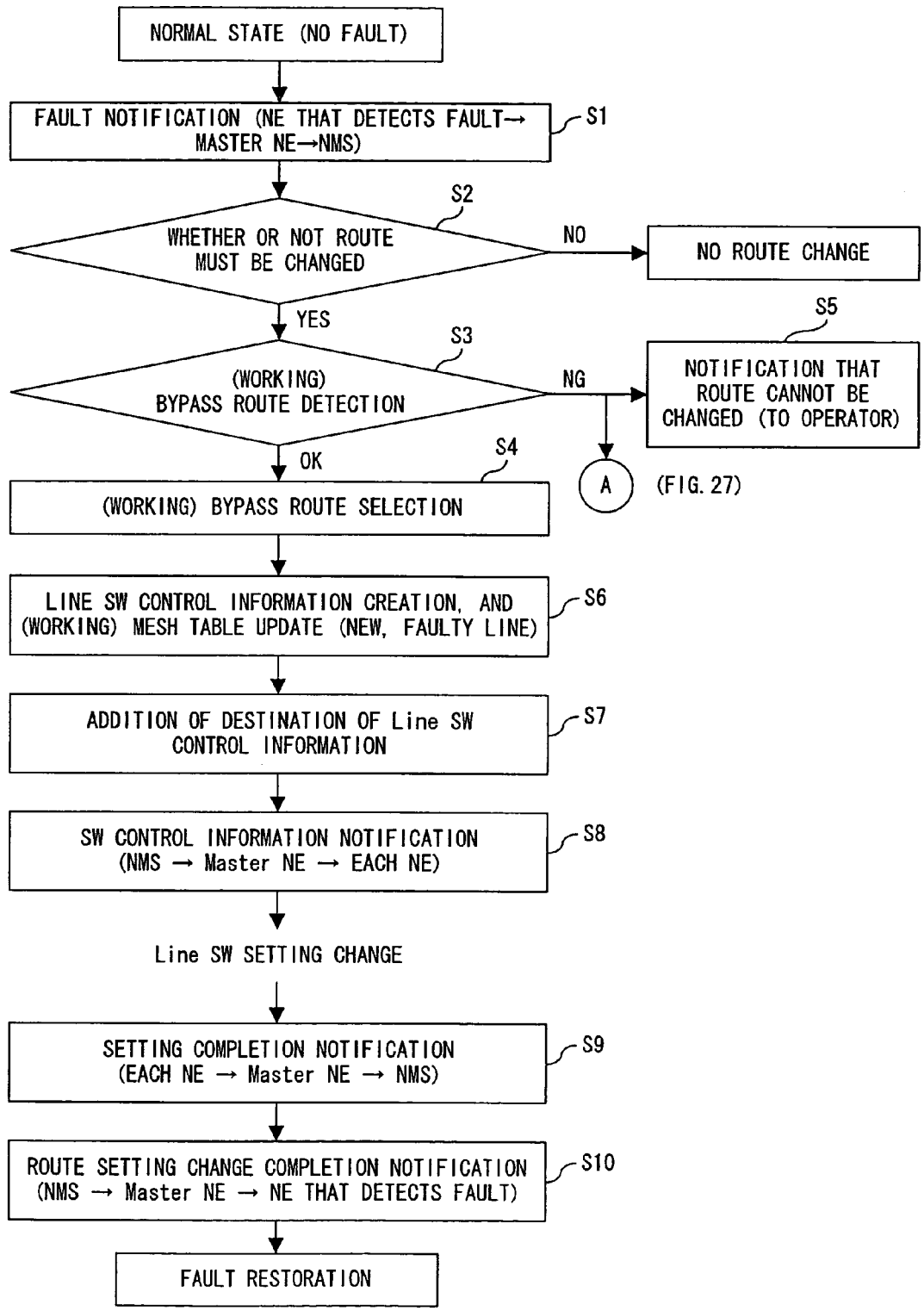
FIG. 26 is a flowchart showing the operations of a network management device.

FIG. 26 is a flowchart showing the operations of the network management device 50. This flowchart corresponds to the restoration process shown in FIG. 13.

In step S1, a message indicating that a fault occurs is notified from a communication node involved in the occurrence of the fault. At this time, this message is notified from the communication node involved in the fault to the master node via a DCC or a function equivalent thereto, and notified from the master node to the network management device 50 via an RS-232C, LAN communication, etc.

In step S2, it is examined whether or not a previously set communication route must be changed due to the occurrence of the notified fault. Specifically, whether or not the notified fault occurs on the previously set communication route is examined by referencing the mesh table and the route table. If the fault occurs in a location uninvolved in the previously set communication route, the process is terminated without changing the route. Or, if the fault occurs on the previously set communication route, operations in and after step S3 are executed.

In steps S3 and S4, whether or not a bypass route for restoring the communication route disconnected by the fault can be set up is examined by referencing the mesh table and the route table. Specifically, it is examined whether or not a route that is not occupied by another communication can be set up. If a plurality of routes can be set up at this time, the shortest route is selected. If a bypass route cannot be set up, a message indicating that a bypass route cannot be set up is transmitted to an operator.

In step S6, the bypass route determined in step S4 is registered to the route table. Then, switch control information (including information for controlling the optical switches of the switch unit 10) for implementing the bypass route in a communication node involved in the bypass route is created. In step S7, the destination of the switch control information is set. In step S8, the created switch control information is transmitted to the corresponding communication node. At this time, the switch control information is transmitted from the network management device 50 to the master node via an RS-232C, LAN communication, etc., and transferred from the master node to the corresponding communication node via a DCC or a function equivalent thereto.

Each communication node involved in the bypass route controls the states of the optical switches of the optical switch unit 10 in accordance with the switch control information transmitted from the network management device 50. After switching the state of the corresponding optical switches in accordance with the switch control information, each communication node transmits a setting completion notification to the network management device 50.

In step S9, the setting completion notification is received from each communication node involved in the bypass route. Then, in step S10, a message indicating that the route change is completed is notified to the communication node that detects the fault, and the process is terminated.

If a communication method of the communication route influenced by the fault is considered when it is determined whether or not the route must be changed, the communications system shown in FIGS. 22 to 25 is implemented.

Figure 27:
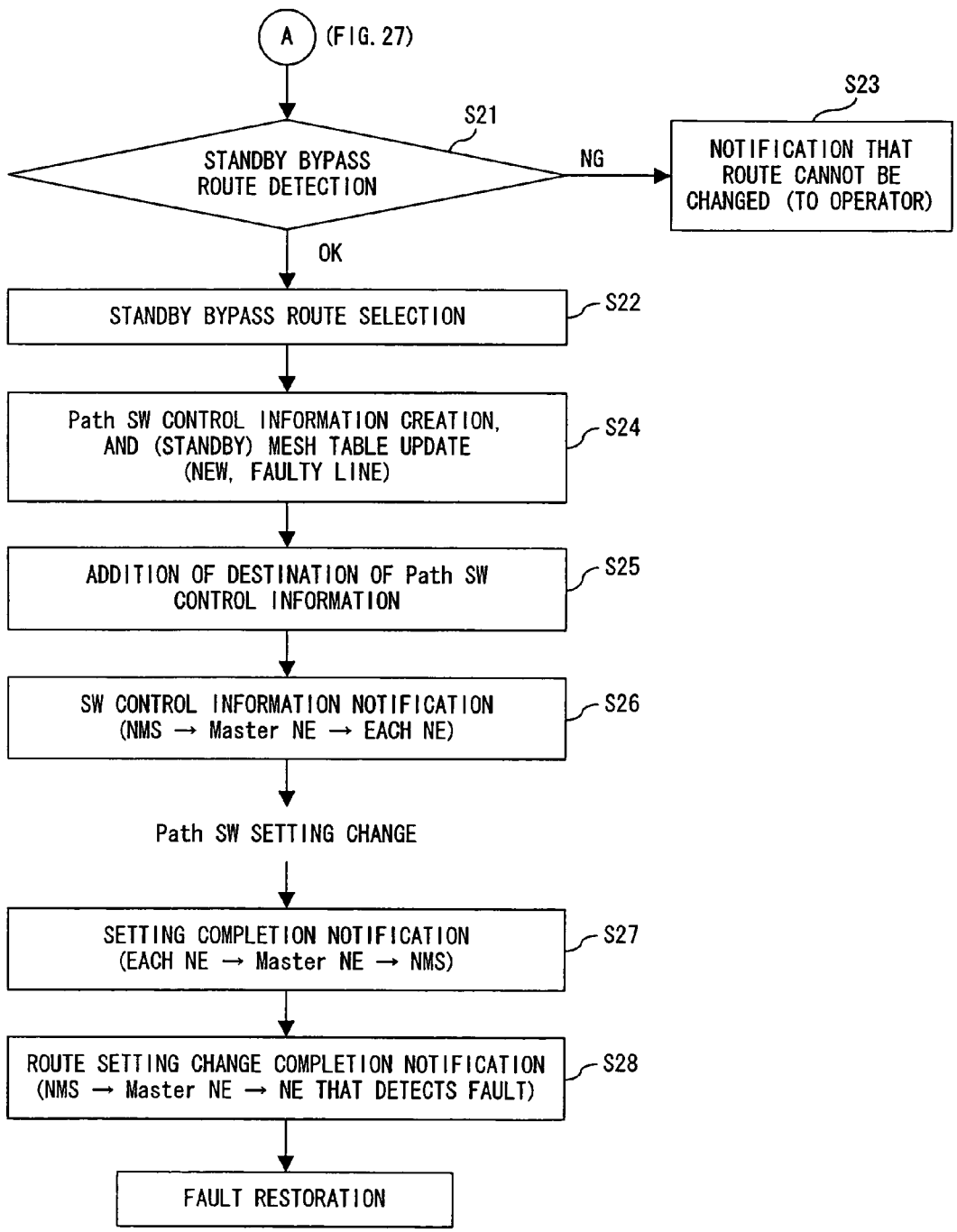
FIG. 27 is a flowchart showing the operations of a network management device in the further preferred embodiment.

FIG. 27 is a flowchart showing the operations of the network management device 50 in another embodiment. This flowchart corresponds to the restoration process shown in FIGS. 15 to 19. Namely, this flowchart assumes that a payload of a digital wrapper frame is separated into a working system area and a standby system area. The process represented by this flowchart is executed when a fault occurs on the digital wrapper network, and it is determined that the fault cannot be restored with a working system route that is set up with the working system area.

In steps S21 and S22, whether or not a bypass route for restoring a path disconnected by the fault can be set up using a standby system route which is set up with the standby system area is examined by referencing the mesh table and the route table shown in FIGS. 16A and 16B. If a plurality of bypass routes can be set up at this time, the shortest route is selected. If a bypass route cannot be set up even with a standby system route, a message indicating that a bypass route cannot be set up is transmitted to an operator in step S23.

The steps S24 to S28 are fundamentally the same as steps S6 to S10 shown in FIG. 26. Although switch control information for selecting lines to be mutually connected in each communication node is created in the embodiment shown in FIG. 26, a plurality of virtual paths (working system/standby system) can be set up on each line in the embodiment shown in FIG. 27. Therefore, switch control information for selecting virtual paths to be mutually connected in each communication node is created.

According to the present invention, a digital wrapper network can be built with simple configuration or at low cost. Additionally, a fault restoration function is comprised, so that the reliability of a network is improved. Furthermore, units that configure a communication node can be added/replaced with ease, whereby working time required when a network configuration is changed/expanded can be reduced.

What is claimed is:

1. A communications system used in a network where a plurality of communication nodes are connected, comprising:
    a digital wrapper unit, which is provided in each of the plurality of communication nodes, transmitting/receiving a digital wrapper frame;
    a converting unit, which is provided in each of first and second communication nodes among the plurality of communication nodes, performing mutual conversion between data in a predetermined format and a digital wrapper frame; and
    a network management unit managing states of the plurality of communication nodes, wherein
    said digital wrapper unit transmits to the second communication node a digital wrapper frame obtained by said converting unit in the first communication node in accordance with an instruction from said network management unit, and
    said converting unit, which is provided in the second communication node, converts the received digital wrapper frame into the data in the predetermined format, and
    wherein said network management unit comprises
        a first storing unit storing topology information that represents a connection relationship among the plurality of communication nodes,
        a second storing unit storing route information that represents a communication route connecting the first communication node and the second communication node, and
        a controlling unit giving an instruction to a communication node involved in the communication route based on the topology information and the route information, and
    wherein a payload of the digital wrapper frame includes a first area and a second area, and
    said network management unit manages information for using communication resources of respective lines between the plurality of communication nodes as first and second paths, and
    said controlling unit gives to a corresponding communication node an instruction for setting up the communication route by using the first path to transmit data in the first area if a fault is not detected on the network, and gives to a corresponding communication node an instruction for setting up a bypass route by using the second path to transmit data in the second area according to a location where a fault occurs if the fault is detected on the network.

2. The communications system according to claim 1, further comprising
    a route determining unit determining a communication route connecting the first communication node and the second communication node by referencing the topology information and previously stored route information, and writing route information corresponding to the newly determined communication route to said second storing unit.

3. The communications system according to claim 1, wherein:
    said network management unit further comprises
        a fault detecting unit detecting a location where a fault occurs on the network, and
        an updating unit updating the route information stored in said second storing unit according to the location where the fault occurs, which is detected by said fault detecting unit; and
    said controlling unit gives an instruction to a corresponding communication node based on the route information updated by said updating unit.

4. The communications system according to claim 1, wherein:
    a line between the plurality of communication nodes is a WDM transmission line; and
    each of the plurality of communication nodes further comprises a multiplexing unit transmitting digital wrapper frames that store different data in parallel.

5. The communications system according to claim 4, wherein
    each of the plurality of communication nodes further comprises an equalizing unit equalizing a WDM signal.

6. The communications system according to claim 5, wherein
    said equalizing unit is a variable optical attenuator attenuating WDM light, and a controlling circuit controlling the variable optical attenuator.

7. The communications system according to claim 5, wherein
    said equalizing unit is an optical amplifier amplifying WDM light, and a controlling circuit controlling the optical amplifier.

8. A network management device managing a network where a plurality of communication nodes are connected, comprising:
    a first storing unit storing topology information that represents a connection relationship among the plurality of communication nodes;
    a second storing unit storing route information that represents a communication route connecting first and second communication nodes among the plurality of communication nodes, each of the first and second communication nodes comprising a digital wrapper unit transmitting/receiving a digital wrapper frame, and a converting unit performing mutual conversion between data in a predetermined format and said digital wrapper frame;
    a network management unit managing states of the plurality of communication nodes, wherein said digital wrapper unit transmits to second communication node a digital wrapper frame obtained by said converting unit in the first communication node in accordance with an instruction from said network management unit, and said converting unit, which is provided in second communication node, converts the received digital wrapper frame into the data in the predetermined format; and
    a controlling unit giving an instruction for transmitting a digital wrapper frame to a communication node involved in the communication route based on the topology information and the route information, and
    wherein a payload of the digital wrapper frame includes a first area and a second area, and
    said network management device manages information for using communication resources of respective lines between the plurality of communication nodes as first and second paths, and
    said controlling unit gives to a corresponding communication node an instruction for setting up the communication route by using the first path to transmit data in the first area if a fault is not detected on the network, and gives a corresponding communication node an instruction for setting up a bypass route by using the second path to transmit data in the second area according to a location where a fault occurs if the fault is detected on the network.

9. The network management device according to claim 8, further comprising:
    a fault detecting unit detecting a location where a fault occurs on the network; and
    an updating unit updating the route information stored in said second storing unit according to the location where the fault occurs, which is detected by said fault detecting unit, wherein
    said controlling unit gives an instruction to a corresponding communication node based on the route information updated by said updating unit.

* * * * *

UNITED STATES PATENT AND TRADEMARK OFFICE
CERTIFICATE OF CORRECTION

PATENT NO. : 7,539,775 B2 Page 1 of 1
APPLICATION NO. : 10/721548
DATED : May 26, 2009
INVENTOR(S) : Nobuhiro Rikitake et al.

It is certified that error appears in the above-identified patent and that said Letters Patent is hereby corrected as shown below:

Column 17, Line 6, change "comprises" to --comprises:--.

Column 18, Line 29, change "a" to --to a--.

Signed and Sealed this

Eighth Day of September, 2009

David J. Kappos
*Director of the United States Patent and Trademark Office*